United States Patent
Zhang et al.

(10) Patent No.: US 12,278,916 B2
(45) Date of Patent: Apr. 15, 2025

(54) DATA PROCESSING METHOD AND APPARATUS, DEVICE, AND MEDIUM

(71) Applicant: Huawei Cloud Computing Technologies Co., Ltd., Guizhou (CN)

(72) Inventors: Yu Zhang, Beijing (CN); Kai Guo, Xi'an (CN); Tengfei Xue, Beijing (CN); Mengmeng Zhou, Gui'an (CN); Lei Wang, Xi'an (CN); Yue Yu, Beijing (CN)

(73) Assignee: Huawei Cloud Computing Technologies Co., Ltd., Gui'an (CN)

( * ) Notice: Subject to any disclaimer, the term of this patent is extended or adjusted under 35 U.S.C. 154(b) by 297 days.

(21) Appl. No.: 17/894,367

(22) Filed: Aug. 24, 2022

(65) Prior Publication Data

US 2022/0407729 A1 Dec. 22, 2022

Related U.S. Application Data

(63) Continuation of application No. PCT/CN2021/075360, filed on Feb. 4, 2021.

(30) Foreign Application Priority Data

Feb. 27, 2020 (CN) .......................... 202010123883.0
Aug. 31, 2020 (CN) .......................... 202010895954.9

(51) Int. Cl.
*H04L 9/00* (2022.01)
*H04L 9/06* (2006.01)
*H04L 9/40* (2022.01)

(52) U.S. Cl.
CPC .............. *H04L 9/50* (2022.05); *H04L 9/0618* (2013.01); *H04L 9/0643* (2013.01); *H04L 63/0435* (2013.01)

(58) Field of Classification Search
CPC ....... H04L 9/50; H04L 9/0618; H04L 9/0643; H04L 63/0435; H04L 9/0825;
(Continued)

(56) References Cited

U.S. PATENT DOCUMENTS 11,856,085 B2 * 12/2023 Tojima ...................... H04L 9/30
2020/0159696 A1 * 5/2020 Adluri ................... H04L 9/3239
(Continued)

FOREIGN PATENT DOCUMENTS

CN    104410493 A    3/2015
CN    107508806 A    12/2017
(Continued)

OTHER PUBLICATIONS

A Distributed Peer-to-Peer Storage Network, Kothari et al., Nov. 2019 (Year: 2029).*

*Primary Examiner* — Jahangir Kabir

(57) ABSTRACT

A data provider encrypts source data to obtain a ciphertext of the source data, and uploads the ciphertext of the source data to a data storage platform for storage. Subsequently, in response to a data application request of a data consumer, the data provider encrypts a storage address of the ciphertext of the source data by using a public key of the data consumer, and uploads the encrypted storage address to a blockchain network. The data consumer obtains the ciphertext of the source data from the data storage platform. In the process, a blockchain decentralization capability is used to implement secure and trusted data exchange by using a smart contract that is public and commonly visible to a plurality of parties.

16 Claims, 8 Drawing Sheets

(58) Field of Classification Search
CPC ..... H04L 63/045; H04L 63/126; G06F 21/64; G06F 16/27; G06F 21/53
USPC .......................................................... 726/162
See application file for complete search history.

(56) References Cited

U.S. PATENT DOCUMENTS

2020/0177579 A1* 6/2020 Allen .................... H04L 9/3239
2021/0319132 A1* 10/2021 Zhang ..................... H04L 63/18

FOREIGN PATENT DOCUMENTS

| CN | 108881262 A | 11/2018 |
| CN | 110581839 A | 12/2019 |

* cited by examiner

DATA PROCESSING METHOD AND APPARATUS, DEVICE, AND MEDIUM

CROSS-REFERENCE TO RELATED APPLICATIONS

This application is a continuation of International Patent Application No. PCT/CN2021/075360, filed on Feb. 4, 2021, which claims priority to both Chinese Patent Application No. 202010895954.9, filed on Aug. 31, 2020, and Chinese Patent Application No. 202010123883.0, filed on Feb. 27, 2020. The disclosures of the aforementioned priority applications are hereby incorporated by reference in their entirety.

TECHNICAL FIELD

This application relates to the field of blockchain technologies, and in particular, to a data processing method and apparatus, a device, and a computer-readable storage medium.

BACKGROUND

With development of the digital society, individuals, enterprises, government departments, and other organizations have accumulated a large amount of data. There are strong requirements for data exchange and sharing between individuals, between an individual and an organization, or between organizations. To ensure data security, a trusted third-party platform usually needs to be introduced for verification, and data exchange is performed after the verification succeeds.

The foregoing data exchange method highly depends on the third-party platform. However, a service provider of the third-party platform has a capability of accessing, using, and controlling data and a service system, and it is difficult for a data owner to effectively supervise and manage the platform. Consequently, there is a relatively high data security risk.

Based on this, the industry urgently needs to provide a more secure and reliable data processing method.

SUMMARY

This application provides a data processing method. In the method, a blockchain decentralization capability is used to implement secure and trusted data exchange by using a smart contract that is public and commonly visible to a plurality of parties. On a basis of the secure and trusted data exchange, data may be further analyzed. This application further provides an apparatus, a device, a computer-readable storage medium, and a computer program product corresponding to the foregoing method.

According to a first aspect, this application provides a data processing method. The data processing method is specifically performing trusted data exchange between a data provider and a data consumer in a blockchain network. The blockchain network includes a plurality of peer nodes. The data provider is a party that provides data in the blockchain network, and the data provider may include a peer node that provides data. The data consumer is a party that obtains data in the blockchain network, and the data consumer may include a peer node that obtains data. In some embodiments, the data provider further includes a client connected to the peer node that provides data, and the data consumer further includes a client connected to the peer node that obtains data.

Specifically, the data provider encrypts source data to obtain a ciphertext of the source data, and uploads the ciphertext of the source data to a data storage platform for storage. Then, in response to a data application request of the data consumer, the data provider encrypts a storage address of the ciphertext of the source data by using a public key of the data consumer, and uploads the encrypted storage address to the blockchain network. The data provider and the data consumer are both located in the blockchain network, and the storage address is transferred to the data consumer in the blockchain network in a trusted manner.

In the method, a blockchain decentralization capability is used to implement secure and trusted data exchange. Without a help of a third-party platform, an information asymmetry problem caused by the third-party platform is resolved, a data barrier is broken, and data value circulation is implemented when it is ensured that data ownership remains unchanged. This avoids a data jurisdiction problem and avoids damage to a user's right to use and control data.

In some possible implementations, the data provider may encrypt the source data by using a symmetric key. Based on this, the data provider may encrypt the symmetric key by using a public key of the data consumer, and then upload the encrypted symmetric key to the blockchain network. Therefore, the data consumer may obtain the encrypted symmetric key from the blockchain network, and obtain the symmetric key by decrypting the encrypted symmetric key by using a private key of the data consumer. When obtaining the ciphertext of the source data, the data consumer may decrypt the ciphertext of the source data by using the symmetric key, to obtain the source data.

A symmetric encryption algorithm has advantages such as a small calculation amount, a fast encryption speed, and high encryption efficiency. An asymmetric encryption algorithm has advantages such as high security. In the method, the source data is encrypted by using the symmetric encryption algorithm, and an encryption key (symmetric key) is encrypted by using the asymmetric encryption algorithm. This achieves balance between encryption efficiency and security.

In some possible implementations, the data provider may further examine the data application request of the data consumer, to obtain an examination record. The examination record is used to determine that the data application request is approved. The data provider may upload the examination record to the blockchain network, to trace a data sharing process subsequently. This ensures data security.

In some possible implementations, the data provider may further upload attribute data of the source data to the blockchain network. The attribute data includes at least one of a hash value, metadata, description information, attestation data, and pricing data of the source data.

The description information is specifically used to describe content of the source data. In some embodiments, the description information may include an enterprise financial report in the $n^{th}$ quarter of xx, a government work report in the $n^{th}$ quarter of xx, or the like. The metadata is data that describes one or more features of the source data. For example, the metadata may be an author, a release time, or a keyword. The attestation data is data that proves an identity of a subject of the source data, for example, may be a signature. The pricing data is a price that is set by the data provider for the source data. The data consumer usually pays a corresponding digital asset according to the foregoing price to obtain the source data. The hash value is obtained by performing hash calculation on the source data.

The data consumer may present the foregoing attribute data to a user, for example, any one or more of the metadata, the description information, the attestation data, and the pricing data. Therefore, the user may select, based on the foregoing attribute data, source data that needs to be applied for or used. The hash value of the source data may be used to perform verification on correctness of the source data after the user obtains the source data.

According to a second aspect, this application provides a data processing method. The data processing method is specifically performing trusted data analysis in a blockchain network. A data provider in the blockchain network provides source data, a data executor in the blockchain network analyzes the source data to obtain a data analysis result, and a data consumer in the blockchain network obtains the data analysis result. The data executor is a party that analyzes data in the blockchain network. The data executor may include a peer node that analyzes data in the blockchain network. In some embodiments, the data executor may further include a client connected to the peer node that analyzes data.

Specifically, the data provider encrypts source data to obtain a ciphertext of the source data, and uploads the ciphertext of the source data to a data storage platform for storage. Then, in response to a data analysis request of the data consumer, the data provider encrypts a storage address of the ciphertext of the source data by using a public key of the data executor, and uploads the encrypted storage address to the blockchain network.

The data provider, the data consumer, and the data executor are all located in the blockchain network, and the storage address is transferred to the data executor in the blockchain network in a trusted manner. Therefore, the data executor may obtain the ciphertext of the source data, decrypt the ciphertext of the source data, and then analyze the source data obtained through decryption, to obtain the data analysis result. The data consumer and the data executor perform trusted data exchange to obtain the data analysis result. This implements secure and reliable data analysis, resolves an information asymmetry problem caused by a third-party platform, and breaks a data barrier.

In some possible implementations, the data provider encrypts the source data by using a symmetric key. Based on this, the data provider may further encrypt a first symmetric key by using a public key of the data executor, and then upload the encrypted first symmetric key to the blockchain network.

In the method, the source data is encrypted by using a symmetric encryption algorithm, and an encryption key (symmetric key) is encrypted by using an asymmetric encryption algorithm. This achieves balance between encryption efficiency and security.

In some possible implementations, the data provider may further examine the data analysis request of the data consumer, to obtain an examination record. The examination record is used to determine that the data analysis request is approved. The data provider may upload the examination record of the data analysis request to the blockchain network, to trace a data sharing process subsequently. This ensures data security.

In some possible implementations, the data provider may further upload attribute data of the source data to the blockchain network. The attribute data includes at least one of a hash value, metadata, description information, attestation data, and pricing data of the source data.

Correspondingly, the data consumer may present the foregoing attribute data to a user, for example, any one or more of the metadata, the description information, the attestation data, and the pricing data. Therefore, the user may select, based on the foregoing attribute data, source data that needs to be analyzed.

According to a third aspect, this application provides a data processing method. The data processing method is specifically performing trusted data exchange between a data provider and a data consumer in a blockchain network.

Specifically, the data consumer sends a data application request. The data application request is used to request source data of the data provider, the data provider and the data consumer are both located in the blockchain network, and the source data is stored in a data storage platform. Then, the data consumer obtains a storage address of the source data from the blockchain network, and obtains a ciphertext of the source data from the data storage platform based on the storage address. Subsequently, the data consumer decrypts the ciphertext of the source data to obtain the source data.

In the method, a blockchain decentralization capability is used to implement secure and trusted data exchange. Without a help of a third-party platform, an information asymmetry problem caused by the third-party platform is resolved, a data barrier is broken, and data value circulation is implemented when it is ensured that data ownership remains unchanged. This avoids a data jurisdiction problem and avoids damage to a user's right to use and control data.

In some possible implementations, a user may select one or more pieces of source data by using attribute data or the like presented by the data consumer, to trigger an application operation for the source data. Correspondingly, the data consumer generates the data application request triggered by the user. This triggers trusted data exchange between the data consumer and the data provider, and implements secure and reliable data processing.

In some possible implementations, the data consumer may obtain attribute data of the source data of the data provider from the blockchain network. The attribute data includes at least one of a hash value, metadata, description information, attestation data, and pricing data of the source data. The metadata, the description information, the attestation data, and the pricing data may be used to help the user select source data that needs to be applied for, and the hash value may be used to verify whether source data obtained by the user is tampered with. This ensures security of the source data.

In some possible implementations, the data consumer may present the attribute data of the source data to the user. The attribute data includes the at least one of the hash value, the metadata, the description information, the attestation data, and the pricing data of the source data. Therefore, the user may select, based on the attribute data of the source data presented by the data consumer, source data that needs to be applied for or used, to trigger an application operation for the source data.

By presenting the foregoing attribute data of the source data, the user may correctly select expected data. This avoids a case in which applied data is not expected data due to a user input error or the like, and improves user experience.

In some possible implementations, when the storage address obtained from the blockchain network is encrypted by using a public key of the data consumer, the data consumer may further obtain the storage address by decrypting the encrypted storage address by using a private key of the data consumer. Therefore, the data consumer may obtain the ciphertext of the source data based on the storage address.

The encrypted storage address can be decrypted only by using the private key of the data consumer. This can ensure that only the data consumer can obtain the storage address by decrypting the encrypted storage address, and ensure data security.

In some possible implementations, the data consumer may further obtain an examination record of the data application request, and maintain the examination record in a blockchain. Therefore, the examination record of the data application request can be stored, to help trace a subsequent data transaction.

In some possible implementations, after obtaining the source data, the data consumer may further process the source data by using a hash algorithm, to obtain a hash value of the source data. Then, the data consumer may perform verification on correctness of the source data based on the hash values of the source data.

Specifically, the data consumer may compare the locally calculated hash value of the source data with the hash value obtained from the blockchain network. If the hash values are consistent, it indicates that the source data obtained by the data consumer is correct; or if the hash values are inconsistent, it indicates that the source data obtained by the data consumer is incorrect, and the source data may be tampered with.

By performing verification on the source data, this method ensures that the data consumer obtains correct data, and prevents the data consumer from making improper decisions based on tampered and incorrect data.

According to a fourth aspect, this application provides a data processing method. The data processing method is specifically performing trusted data analysis in a blockchain network.

Specifically, a data consumer sends a data analysis request. The data analysis request is used to analyze source data of a data provider. The data provider and the data consumer are both located in the blockchain network, and the source data is stored in a data storage platform. Then, the data consumer obtains a ciphertext of a data analysis result from the data storage platform based on a storage address of the ciphertext of the data analysis result in the data storage platform. Subsequently, the data consumer decrypts the ciphertext of the data analysis result to obtain the data analysis result.

After the data consumer sends the data analysis request, a data executor and the data provider perform trusted data exchange to obtain the source data. The data executor analyzes the source data to obtain the data analysis result. The data consumer and the data executor perform trusted data exchange to obtain the data analysis result. This implements secure and reliable data analysis, resolves an information asymmetry problem caused by a third-party platform, and breaks a data barrier.

In some possible implementations, the data consumer obtains attribute data of the source data of the data provider from the blockchain network. The attribute data includes at least one of a hash value, metadata, description information, attestation data, and pricing data of the source data. The metadata, the description information, the attestation data, and the pricing data may be used to help the user select source data that needs to be applied for, and the hash value may be used to verify whether source data obtained by the user is tampered with. This ensures security of the source data.

In some possible implementations, a user may select one or more pieces of source data by using attribute data or the like presented by the data consumer, to trigger an analysis operation for the source data. Correspondingly, the data consumer generates the data analysis request triggered by the user. This triggers data analysis, and implements secure and reliable data processing.

In some possible implementations, the data consumer may present the attribute data of the source data to the user. The attribute data includes the at least one of the hash value, the metadata, the description information, the attestation data, and the pricing data of the source data. Therefore, the user may select, based on the attribute data of the source data presented by the data consumer, source data that needs to be analyzed, to trigger an application operation for the source data.

By presenting the foregoing attribute data of the source data, the user may correctly select expected data. This avoids a case in which analyzed data is not expected data due to a user input error or the like, and improves user experience.

In some possible implementations, the data consumer may further obtain an examination record of the data analysis request, and maintain the examination record in a blockchain. Therefore, the examination record of the data application request can be stored, to help trace a subsequent data transaction.

In some possible implementations, the data consumer may obtain, from the blockchain network, a second symmetric key encrypted by using a public key of the data consumer. The second symmetric key is used to encrypt the data analysis result. The data consumer may obtain the second symmetric key by decrypting the encrypted second symmetric key by using a private key of the data consumer, and the data consumer decrypts the ciphertext of the data analysis result by using the second symmetric key, to obtain the data analysis result.

In the method, the data analysis result is encrypted by using a symmetric encryption algorithm, and an encryption key (for example, the second symmetric key) is encrypted by using an asymmetric encryption algorithm. This implements full use of advantages of the symmetric encryption algorithm and the asymmetric encryption algorithm, and implements balance between encryption efficiency and security.

According to a fifth aspect, this application provides a data processing method. The data processing method is specifically performing trusted data analysis in a blockchain network.

Specifically, a data executor obtains a storage address of a ciphertext of source data of a data provider from the blockchain network. The data executor and the data provider are both located in the blockchain network, and the storage address is transferred to the data executor in the blockchain network in a trusted manner. Then, the data executor obtains the ciphertext of the source data from a data storage platform based on the storage address, and the data executor analyzes the source data obtained by decrypting the ciphertext of the source data, to obtain a data analysis result. Then, the data executor encrypts the data analysis result to obtain a ciphertext of the data analysis result, and uploads the ciphertext of the data analysis result to the data storage platform.

The data executor obtains the ciphertext of the source data, analyzes the source data obtained through decryption, to obtain the data analysis result, encrypts the data analysis result, and then uploads the encrypted data analysis result to the data storage platform. This ensures security of the source data and the data analysis result.

In some possible implementations, the data executor encrypts the data analysis result by using a second symmetric key. Correspondingly, the data executor encrypts the second symmetric key by using a public key of the data consumer, and uploads the encrypted second symmetric key to the blockchain network. Therefore, the data consumer may obtain the encrypted second symmetric key from the blockchain network, and obtain the second symmetric key by decrypting the encrypted second symmetric key by using a private key of the data consumer. When obtaining the ciphertext of the data analysis result, the data consumer may decrypt the ciphertext of the data analysis result by using the second symmetric key, to obtain the data analysis result.

In the method, the data analysis result is encrypted by using a symmetric encryption algorithm, and an encryption key (for example, the second symmetric key) is encrypted by using an asymmetric encryption algorithm. This implements full use of advantages of the symmetric encryption algorithm and the asymmetric encryption algorithm, and implements balance between encryption efficiency and security.

In some possible implementations, the data executor may analyze, in a sandbox, the source data obtained by decrypting the ciphertext of the source data, to obtain the data analysis result.

The sandbox is an execution environment that restricts program behavior according to a security policy. The sandbox may restrict service logic to only performing data analysis and outputting a result to a specific location (for example, a storage address of an analysis result that is specified by the data consumer). However, the source data provided by the data provider is not output to the outside of the sandbox. The sandbox is placed in a repository that is public to all participants. The service logic of the sandbox is public to all the participants, and can be reviewed and audited by all the participants. This can ensure sandbox reliability. The source data is analyzed in the sandbox, to ensure reliability of the data analysis result.

In some possible implementations, considering a risk that the source data may be tampered with, the data executor may perform, in the sandbox, verification on the source data obtained by decrypting the ciphertext of the source data. When verifying that the source data is correct, the data executor performs subsequent analysis. This can further improve reliability of the analysis result.

In some possible implementations, after obtaining the storage address of the ciphertext of the source data, the data executor may further delete a private key of the data executor. This prevents the storage address of the ciphertext of the source data from being illegally decrypted due to leakage of the private key, further prevents the source data from being leaked, and ensures security of the source data.

In some possible implementations, after uploading the ciphertext of the data analysis result to the data storage platform, the data executor deletes the source data and the data analysis result. This prevents the source data and the data analysis result from being leaked due to an attack on the data executor, and reduces a security risk.

According to a sixth aspect, this application provides a data processing apparatus. The apparatus is applied to a data provider. The apparatus includes:
 an encryption module, configured to encrypt source data of the data provider to obtain
 a ciphertext of the source data; and
 an uploading module, configured to upload the ciphertext of the source data to a data storage platform for storage.

The encryption module is further configured to: in response to a data application request of a data consumer, encrypt a storage address of the ciphertext of the source data by using a public key of the data consumer.

The uploading module is further configured to upload the encrypted storage address to the blockchain network. The data provider and the data consumer are both located in the blockchain network, and the storage address is transferred to the data consumer in the blockchain network in a trusted manner.

In some possible implementations, the encryption module is further configured to encrypt a symmetric key by using the public key of the data consumer. The symmetric key is used to encrypt the source data.

The uploading module is further configured to upload the encrypted symmetric key to the blockchain network.

In some possible implementations, the uploading module is further configured to:
 upload an examination record of the data application request to the blockchain network.

In some possible implementations, the uploading module is further configured to:
 upload attribute data of the source data to the blockchain network, where the attribute data includes at least one of a hash value, metadata, description information, attestation data, and pricing data of the source data.

According to a seventh aspect, this application provides a data processing apparatus. The apparatus is applied to a data provider. The apparatus includes:
 an encryption module, configured to encrypt source data of the data provider to obtain a ciphertext of the source data; and
 an uploading module, configured to upload the ciphertext of the source data to a data storage platform for storage.

The encryption module is further configured to: in response to a data analysis request of a data consumer, encrypt a storage address of the ciphertext of the source data by using a public key of a data executor in a blockchain network.

The uploading module is further configured to upload the encrypted storage address to the blockchain network. The data provider, the data consumer, and the data executor are all located in the blockchain network, and the storage address is transferred to the data executor in the blockchain network.

In some possible implementations, the encryption module is further configured to encrypt a first symmetric key by using the public key of the data executor. The first symmetric key is used to encrypt the source data.

The uploading module is further configured to upload the encrypted first symmetric key to the blockchain network.

In some possible implementations, the uploading module is further configured to:
 upload an examination record of the data analysis request to the blockchain network.

In some possible implementations, the uploading module is further configured to:
 upload attribute data of the source data to the blockchain network, where the attribute data includes at least one of a hash value, metadata, description information, attestation data, and pricing data of the source data.

According to an eighth aspect, this application provides a data processing apparatus. The apparatus is applied to a data consumer. The apparatus includes:
 a sending module, configured to send a data application request, where the data application request is used to request source data of a data provider, the data provider and the data consumer are both located in a blockchain network, and the source data is stored in a data storage platform;

an obtaining module, configured to: obtain a storage address from the blockchain network, and obtain a ciphertext of the source data from the data storage platform based on the storage address; and a decryption module, configured to decrypt the ciphertext of the source data to obtain the source data.

In some possible implementations, the obtaining module is further configured to:

obtain attribute data of the source data of the data provider from the blockchain network, where the attribute data includes at least one of a hash value, metadata, description information, attestation data, and pricing data of the source data.

In some possible implementations, the apparatus further includes:

a presentation module, configured to present the attribute data of the source data to a user.

In some possible implementations, the decryption module is further configured to:

when the storage address obtained from the blockchain network is encrypted by using a public key of the data consumer, obtain the storage address by decrypting the encrypted storage address by using a private key of the data consumer.

In some possible implementations, the obtaining module is further configured to obtain an examination record of the data application request, and the apparatus further includes:

a processing module, configured to maintain the examination record in a blockchain.

In some possible implementations, the apparatus further includes:

a verification module, configured to: process the source data by using a hash algorithm, to obtain a hash value of the source data; and perform verification on correctness of the source data based on the hash values of the source data.

According to a ninth aspect, this application provides a data processing apparatus. The apparatus is applied to a data consumer. The apparatus includes:

a sending module, configured to send a data analysis request, where the data analysis request is used to analyze source data of a data provider, the data provider and the data consumer are both located in a blockchain network, and the source data is stored in a data storage platform;

an obtaining module, configured to obtain a ciphertext of a data analysis result from the data storage platform based on a storage address of the ciphertext of the data analysis result in the data storage platform; and a decryption module, configured to decrypt the ciphertext of the data analysis result to obtain the data analysis result.

In some possible implementations, the obtaining module is further configured to:

obtain attribute data of the source data of the data provider from the blockchain network, where the attribute data includes at least one of a hash value, metadata, description information, attestation data, and pricing data of the source data.

In some possible implementations, the apparatus further includes:

a presentation module, configured to present the attribute data of the source data to a user.

In some possible implementations, the obtaining module is further configured to obtain, from the blockchain network, a second symmetric key encrypted by using a public key of the data consumer. The second symmetric key is used to encrypt the data analysis result.

The decryption module is further configured to obtain the second symmetric key by decrypting the encrypted second symmetric key by using a private key of the data consumer.

The decryption module is further configured to decrypt the ciphertext of the data analysis result by using the second symmetric key, to obtain the data analysis result.

In some possible implementations, the obtaining module is further configured to obtain an examination record of the data analysis request, and the apparatus further includes:

a processing module, configured to maintain the examination record in a blockchain.

According to a tenth aspect, this application provides a data processing apparatus. The apparatus is applied to a data executor. The apparatus includes:

an obtaining module, configured to: obtain a storage address of a ciphertext of source data of a data provider from a blockchain network, and obtain the ciphertext of the source data from a data storage platform based on the storage address, where the data executor and the data provider are both located in the blockchain network, and the storage address is transferred to the data executor in the blockchain network;

an analysis module, configured to analyze the source data obtained by decrypting the ciphertext of the source data, to obtain a data analysis result;

an encryption module, configured to encrypt the data analysis result to obtain a ciphertext of the data analysis result; and an uploading module, configured to upload the ciphertext of the data analysis result to the data storage platform.

In some possible implementations, the encryption module is further configured to encrypt a second symmetric key by using a public key of a data consumer. The second symmetric key is used to encrypt the data analysis result.

The uploading module is further configured to upload the encrypted second symmetric key to the blockchain network.

In some possible implementations, the analysis module is specifically configured to:

analyze, in a sandbox, the source data obtained by decrypting the ciphertext of the source data, to obtain the data analysis result.

In some possible implementations, the apparatus further includes:

a verification module, configured to perform, in the sandbox, verification on the source data obtained by decrypting the ciphertext of the source data.

In some possible implementations, the apparatus further includes:

a deletion module, configured to delete a private key of the data executor after the storage address of the ciphertext of the source data is obtained.

In some possible implementations, the apparatus further includes:

a deletion module, configured to delete the source data and the data analysis result after the ciphertext of the data analysis result is uploaded to the data storage platform.

According to an eleventh aspect, this application provides a computing device. The computing device includes a processor and a memory.

The processor is configured to execute instructions stored in the memory, so that the computing device is enabled to perform the method according to any implementation of the first aspect, the second aspect, the third aspect, the fourth aspect, or the fifth aspect.

According to a twelfth aspect, this application provides a computer-readable storage medium. The computer-readable storage medium stores instructions. The instructions indicate a computing device to perform the method according to any implementation of the first aspect, the second aspect, the third aspect, the fourth aspect, or the fifth aspect.

According to a thirteenth aspect, this application provides a computer program product including instructions. When the computer program product runs on a computing device, the computing device is enabled to perform the method according to any implementation of the first aspect, the second aspect, the third aspect, the fourth aspect, or the fifth aspect.

In this application, based on the implementations provided in the foregoing aspects, the implementations may be further combined to provide more implementations.

BRIEF DESCRIPTION OF DRAWINGS

To describe the technical methods in embodiments of this application more clearly, the following briefly describes the accompanying drawings for embodiments.

DESCRIPTION OF EMBODIMENTS

Figure 1:
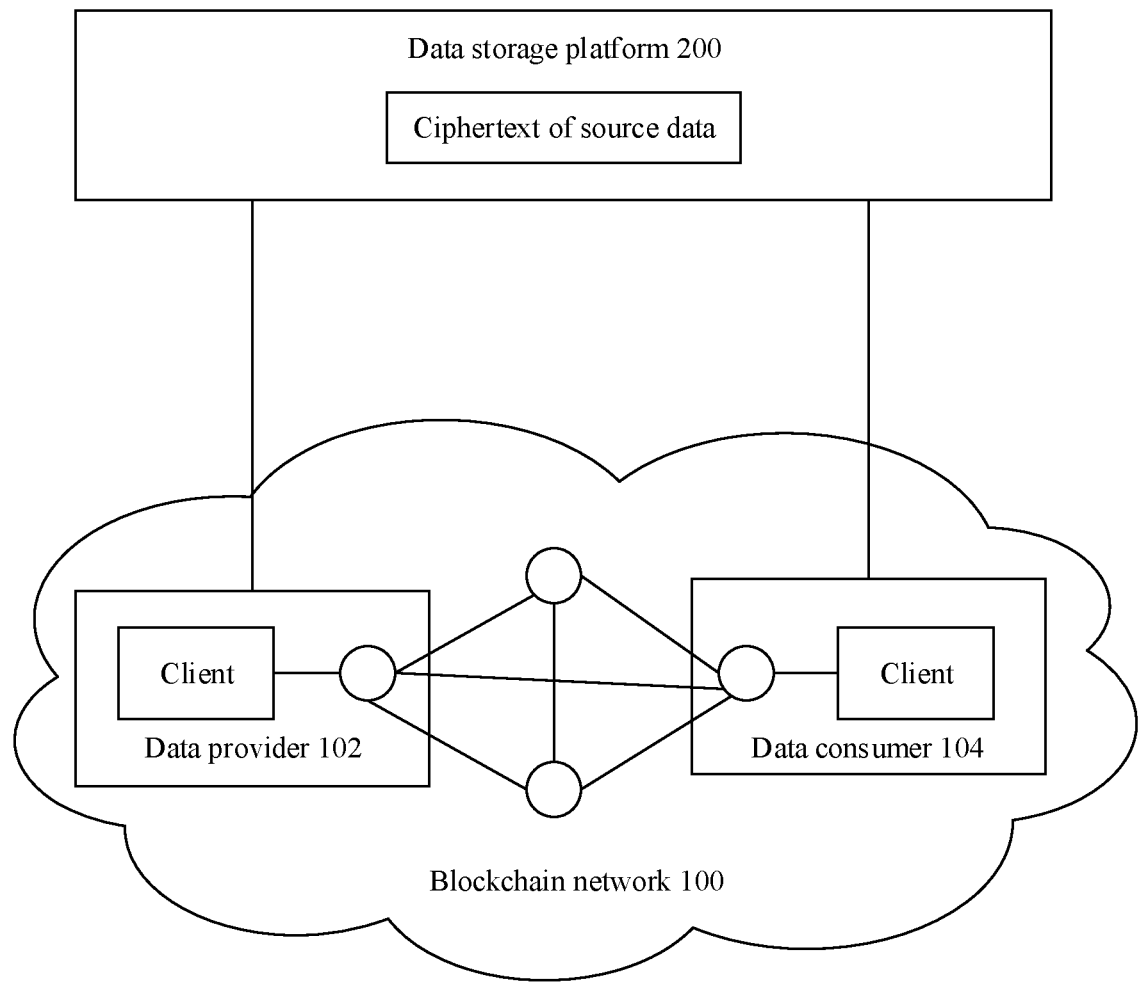
FIG. 1 is a diagram of an architecture of a data processing system according to an embodiment of this application.

Terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more features.

First, some technical terms in embodiments of this application are described.

Data is an identifiable symbol or a combination of identifiable symbols that record an objective event or thing. The identifiable symbol may be specifically a physical symbol that records a property, a state, a relationship, and the like of an objective event or thing. When recorded identifiable symbols are in different forms, the data can be represented in different forms such as a text, a chart, a voice, and a video.

The data may also be classified into personal data, enterprise data, government data, and the like based on different generation subjects. The personal data is data generated by an individual user, for example, a photo taken by the individual user, a copywriting published on a social networking site, or audio and/or a video generated during live broadcast on a live broadcast platform. The enterprise data is data generated by an enterprise user, for example, an enterprise financial report or enterprise performance. The government data is data generated by a government user to reflect government work, for example, tax data generated by a tax bureau.

In many scenarios, data exchange or data analysis is required. During data exchange, a party that provides data is referred to as a data provider, and a party that obtains data is referred to as a data consumer. The data consumer can apply for data from the data provider, and can further request data analysis. Data analysis may be performed by the data provider or the data consumer, or may be performed by a third party. A party that performs data analysis may be referred to as a data executor.

For ease of understanding, with reference to specific examples, the following describes a data processing process such as data exchange or data analysis and describes a data provider, a data consumer, and a data executor in the foregoing data processing process.

For example, in a question and answer scenario, a user usually needs to pay a specific digital asset (for example, a digital currency) to obtain an answer to a question. This implements question and answer data exchange. A party that provides the answer to the question is a data provider, and a party that obtains the question is a data consumer.

For another example, in a tax payment scenario, a government user such as a tax bureau may further obtain data of a government user such as the National Development and Reform Commission or a court, and determine, with reference to the data, whether an enterprise has tax evasion. This implements data analysis. The National Development and Reform Commission, the court, or the like is a data provider, the tax bureau is a data consumer, and a party that performs, with reference to the data provided by the National Development and Reform Commission or the court, data analysis to determine whether the enterprise has tax evasion is a data executor.

In this application, the data provider, the data consumer, and the data executor are deployed on a physical machine, or deployed on a virtual machine or a container on the physical machine. The physical machine includes but is not limited to a computing device such as a desktop computer, a notebook computer, a smartphone, or a server. In an optional implementation, the data provider, the data consumer, and the data executor may alternatively be deployed in a cluster.

A blockchain (blockchain) is a chain formed by one block, and the chain is essentially a shared database. The shared database is jointly maintained by all nodes in a blockchain network. Decentralization of the blockchain network enables the shared database to have features such as non-forgery and non-tampering. In addition, the shared database is public and traceable.

A smart contract (smart contract) is a computer protocol intended to perform contract propagation, verification, or execution in an informatization manner. The smart contract allows trusted transactions to be performed without a third party. These transactions are traceable and irreversible. The smart contract may be applied to the blockchain network. Specifically, the smart contract is usually encapsulated at a contract layer of a blockchain infrastructure, so that a node in the blockchain performs a specified operation when an event specified in the smart contract occurs or a specified condition is met.

Currently, data exchange is mainly implemented based on a third-party platform. A service provider of the third-party platform has a capability of accessing, using, and controlling data and a service system, and it is difficult for a data owner (that is, the data provider) to effectively supervise and manage the platform. Consequently, there is a relatively high data security risk.

The blockchain network is a network on which a plurality of entities that do not trust each other share data or perform a transaction operation in a trusted manner. Specifically, the blockchain network uses a decentralized architecture, and all nodes in the blockchain network jointly maintain the blockchain without relying on a central processing node. Therefore, the blockchain network can be used to share data or perform a transaction operation in a trusted manner.

In view of this, an embodiment of this application provides a data processing method. In the method, a blockchain decentralization capability is used to implement secure and trusted data exchange by using a smart contract that is public and commonly visible to a plurality of parties. On a basis of the secure and trusted data exchange, data may be further analyzed. Without a help of a third-party platform, an information asymmetry problem caused by the third-party platform is resolved, a data barrier is broken, and data value circulation is implemented when it is ensured that data ownership remains unchanged. This avoids a data jurisdiction problem and avoids damage to a user's right to use and control data.

For ease of understanding, the following describes a system architecture of the data processing method provided in this embodiment of this application with reference to the accompanying drawings.

FIG. 1 is a diagram of the system architecture of the data processing method. The system includes a blockchain network 100 and a data storage platform 200. The blockchain network 100 includes a plurality of peer nodes (a circle in FIG. 1 represents one peer node), and there is a peer-to-peer (P2P) connection between the plurality of peer nodes. The peer node may be a physical machine such as a terminal or a server, or may be a virtual machine or a container deployed on the physical machine. It should be noted that the foregoing physical machine may be a computing device in a self-owned data center, or may be a public cloud computing device.

The data storage platform 200 may be a data storage system constructed based on an object storage service (OBS). The OBS can provide a secure, highly reliable, and cost-effective data storage capability to meet a data exchange requirement. Certainly, the data storage platform 200 may alternatively be an InterPlanetary file system (IPFS). The IPFS is specifically a decentralized storage system that allows participants to mutually store, request, and transmit verifiable data.

Any peer node in the blockchain network 100 may provide data for another peer node. A party that provides data is a data provider 102, and a party that obtains data is a data consumer 104. In an optional implementation, as shown in FIG. 1, the data provider 102 further includes a client connected to the peer node that provides data, and the data consumer 104 further includes a client connected to the peer node that obtains data. The client may be a browser, or may be a special-purpose client for implementing the data processing method in this embodiment of this application.

The data provider 102 and the data consumer 104 may implement secure and trusted data processing based on the blockchain network 100 and the data storage platform 200. The secure and trusted data processing may include secure and trusted data exchange and/or secure and trusted data analysis.

Figure 2:
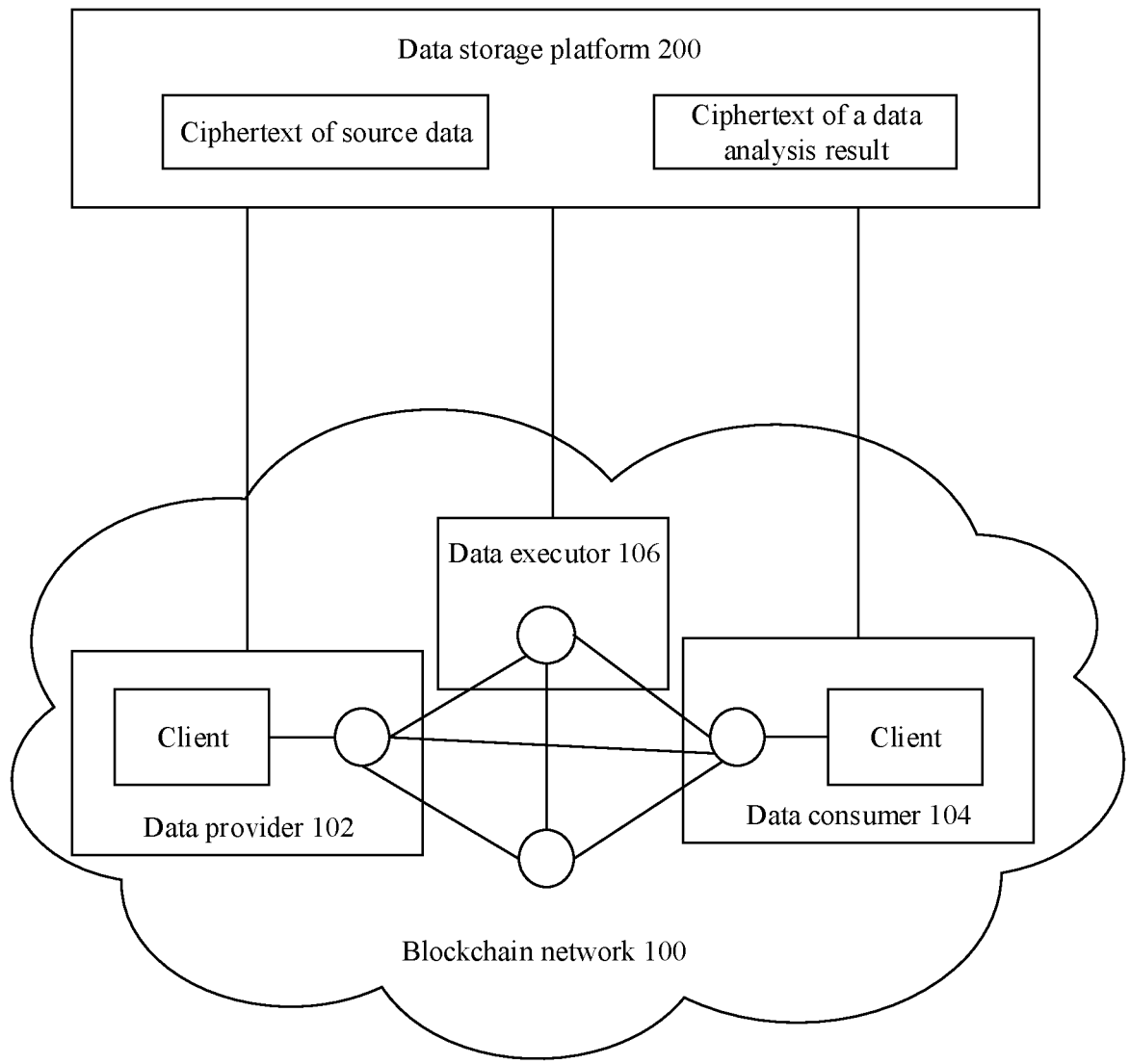
FIG. 2 is a diagram of an architecture of a data processing system according to an embodiment of this application.

Data analysis may be performed by the data provider 102 or the data consumer 104. When it is considered that a plurality of data providers 102 separately provide data, as shown in FIG. 2, data analysis may alternatively be performed by a data executor 106 independent of the data provider 102 and the data consumer 104. The data executor 106 is a node that performs data analysis, and the node may be specifically a peer node in the blockchain network. Similar to the data provider 102 and the data consumer 104, the data executor 106 may further include a client connected to the peer node that performs data analysis.

Specifically, the data provider 102 may encrypt source data of the data provider to obtain a ciphertext of the source data, and then upload the ciphertext of the source data to the data storage platform 200. When using the data, the data consumer 104 may request the data from the data provider 102 through the blockchain network 100.

In an optional implementation, the data consumer 104 may specifically send a data processing request to the blockchain network 100. A smart contract deployed on the blockchain network 100 may send a data processing notification to the data provider 102 based on the data processing request. When receiving the data processing notification, in response to the data processing request, the data provider 102 may encrypt a storage address of the ciphertext of the source data in the data storage platform 200 by using a public key of the data consumer 104 or a public key of the data executor 106, and then upload the encrypted storage address to the blockchain network 100.

The data processing request may be specifically a data application request. The data application request is used to apply for (obtain) the source data. Correspondingly, the data provider 102 may encrypt the storage address of the ciphertext of the source data in the data storage platform 200 by using the public key of the data consumer 104. Therefore, the data consumer 104 may decrypt the encrypted storage address by using a private key of the data consumer 104, to obtain the storage address of the ciphertext of the source data in the data storage platform 200. The data consumer 104 may obtain the ciphertext of the source data from the data storage platform 200 based on the storage address, and decrypt the ciphertext of the source data to obtain the source data.

The data processing request may alternatively be a data analysis request. The data analysis request is used to obtain an analysis result of the source data. As shown in FIG. 2, the source data may be analyzed by the data executor 106. When the data provider 102 receives the data analysis request, the data provider 102 may specifically encrypt the storage address of the ciphertext of the source data in the data storage platform 200 by using the public key of the data executor 106, and upload the encrypted storage address to the blockchain network 100.

The data executor 106 and the data provider 102 may perform secure and trusted data exchange to obtain the source data. Specifically, the data executor 106 may obtain the encrypted storage address from the blockchain network 100 based on the smart contract deployed on the blockchain network 100, and decrypt the encrypted storage address by using a private key of the data executor 106, to obtain the storage address of the ciphertext of the source data in the data storage platform 200. Then, the data executor 106 accesses the data storage platform 200 based on the storage address to obtain the ciphertext of the source data, and decrypts the ciphertext of the source data to obtain the source data.

The data executor 106 analyzes the source data to obtain the data analysis result. The data consumer 104 and the data executor 106 may perform secure and trusted data exchange to obtain the data analysis result. Specifically, the data executor 106 may encrypt the data analysis result to obtain a ciphertext of the data analysis result, and then upload the ciphertext of the data analysis result to the data storage platform 200.

In an optional implementation, the data analysis request may carry a storage address of the ciphertext of the data analysis result. The data executor 106 may store the ciphertext of the data analysis result in the data storage platform 200 based on the storage address of the ciphertext of the data analysis result that is carried in the data analysis request.

In another optional implementation, the data executor 106 may store the ciphertext of the data analysis result in any available space of the data storage platform 200, then encrypt the storage address of the ciphertext of the data analysis result by using the public key of the data consumer 104, and upload the encrypted storage address to the blockchain network 100.

Correspondingly, the data consumer 104 may obtain the ciphertext of the data analysis result from the data storage platform 200 based on a pre-specified storage address of the ciphertext of the data analysis result; or may obtain the encrypted storage address from the blockchain network 100, decrypt the encrypted storage address to obtain the storage address of the ciphertext of the data analysis result, and then obtain the ciphertext of the data analysis result from the data storage platform 200 based on the storage address.

The data executor 106 further encrypts, by using the public key of the data consumer 104, a key used for encrypting the data analysis result, and then uploads the encrypted key to the blockchain network 100. Therefore, the data consumer 104 may obtain a ciphertext of the key from the blockchain network 100, and decrypt the ciphertext of the key by using the private key of the data consumer 104, to obtain the key used for encrypting the data analysis result. For example, the key may be specifically a symmetric key, and the data consumer 102 may decrypt the ciphertext of the data analysis result by using the symmetric key, to obtain the data analysis result.

To make technical solutions of this application clearer and easier to understand, the following describes data processing methods provided in embodiments of this application in detail with reference to the accompanying drawings.

Figure 3:
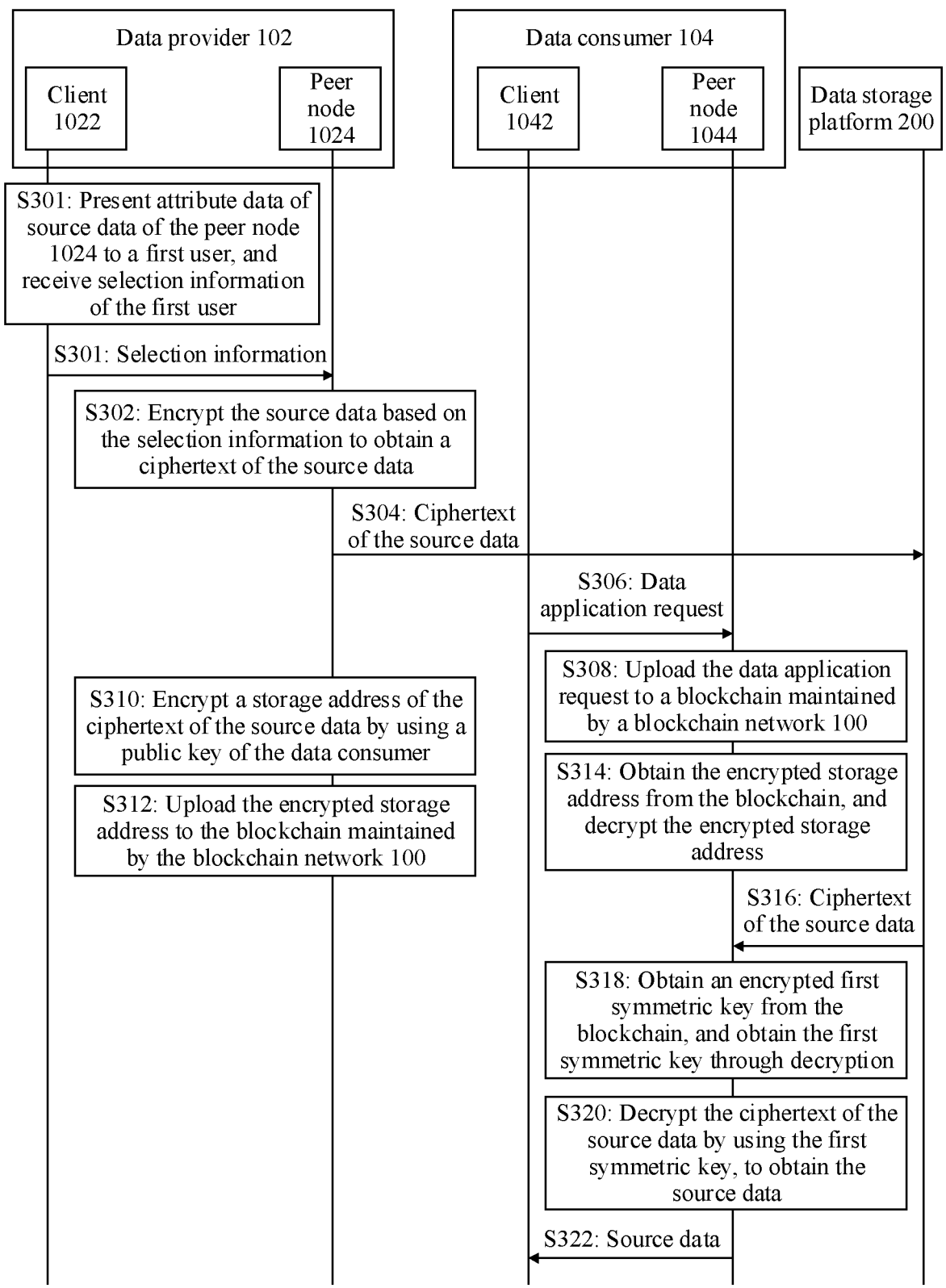
FIG. 3 is a flowchart of interaction of a data processing method according to an embodiment of this application.

FIG. 3 is a flowchart of a data processing method. A data provider 102 in a blockchain network 100 includes a client 1022 and a peer node 1024. A data consumer 104 in the blockchain network 100 includes a client 1042 and a peer node 1044. The blockchain network 100 may further include another peer node (not shown in the figure). The data provider 102 and the data consumer 104 perform data exchange through a data storage platform. The method includes step S301 to step S322.

Step S301: The client 1022 presents attribute data of source data of the peer node 1024 to a first user, receives selection information of the first user, and sends the selection information to the peer node 1024.

Step S302: The peer node 1024 encrypts the source data based on the selection information to obtain a ciphertext of the source data.

Data of the data provider 102 (for example, the peer node 1024 in the data provider 102) is referred to as the source data. The source data may be data of an individual user such as a photo or a copywriting, or may be data of an enterprise user such as a financial report, or may be data of a government user such as a government report and a work plan. To ensure data exchange security, the data provider 102 may encrypt the source data to obtain the ciphertext of the source data.

Considering data privacy, the data provider 102 may select whether to provide the source data for the outside. Specifically, the client 1022 in the data provider 102 presents the attribute data of the source data of the data provider 102 to the first user (a user using the client 1022). The attribute data includes at least one of description information, metadata, attestation data, pricing data, and a hash value of the source data. The first user may select, by using the client 1022, the source data to be provided for the outside. The client 1022 may receive the selection information. The selection information indicates the source data that is selected by the first user and that is provided for the outside, and send the selection information to the peer node 1024. The peer node 1024 may upload the attribute data of the selected source data to the blockchain network 100 based on the selection information. Correspondingly, each peer node in the blockchain network 100 maintains the attribute data of the source data in a corresponding blockchain. In addition, the peer node 1024 may encrypt the selected source data based on the selection information to obtain the ciphertext of the source data.

The description information is specifically used to describe content of the source data. In some embodiments, the description information may include an enterprise financial report in the $n^{th}$ quarter of xx, a government work report in the $n^{th}$ quarter of xx, or the like. The metadata is data that describes one or more features of the source data. For example, the metadata may be an author, a release time, or a keyword. The attestation data is data that proves an identity of a subject of the source data, for example, may be a signature. The pricing data is a price that is set by the data provider 102 for the source data. The data consumer 104 usually pays a corresponding digital asset according to the foregoing price to obtain the source data. The hash value is obtained by performing hash calculation on the source data. The data consumer 104 may verify, based on the hash value, whether the data obtained by the data consumer is real source data.

In an optional implementation, the data provider 102 (for example, the peer node 1024) may encrypt the source data by using a symmetric key and a symmetric encryption algorithm, to obtain the ciphertext of the source data. For ease of distinguishing, the symmetric key used for encrypting the source data is referred to as a first symmetric key in this specification.

In an optional implementation, the data provider (for example, the peer node 1024) may alternatively encrypt the source data in another manner, for example, encrypt the source data in an asymmetric encryption manner, to obtain the ciphertext of the source data. This is not limited in this embodiment of this application.

Step S304: The peer node 1024 uploads the ciphertext of the source data to the data storage platform 200.

The data storage platform 200 may be specifically configured to implement data exchange. For example, the data provider 102 (for example, the peer node 1024) may upload the ciphertext of the source data to the data storage platform 200, and the data consumer 104 (for example, the peer node 1044) may obtain the ciphertext of the source data from the data storage platform 200, to achieve data exchange.

In an optional implementation, the data storage platform 200 is specifically a data storage system. For example, the data storage platform 200 may be a data storage system constructed based on an OBS, or the data storage platform 200 may be an IPFS. This is not limited in this embodiment of this application.

Step S306: The client 1042 in the data consumer 104 sends a data application request to the peer node 1044.

Step S308: The peer node 1044 uploads the data application request to the blockchain maintained by the blockchain network 100.

When a second user needs to obtain or use the source data, the second user may trigger a data application operation by using the client 1042. The client 1042 may generate the data application request based on the data application operation triggered by the second user. The data application request is specifically used to apply for the foregoing source data. Then, the client 1042 sends the data application request to the peer node 1044, and the peer node 1044 uploads the data application request to the blockchain maintained by the blockchain network 100.

Each peer node in the blockchain network 100 maintains a corresponding blockchain. Each peer node in the blockchain network 100 may maintain the data application request in the corresponding blockchain based on a consensus algorithm. Specifically, the data application request is encapsulated in a block. By using a hash value of a previous block in a block header of a current block, each peer node links the current block to the previous block, so that each peer node in the blockchain network 100 stores the data application request.

In an optional implementation, the peer node 1024 may alternatively upload the attribute data of the source data to the blockchain network 100. Correspondingly, each peer node in the blockchain network 100 maintains the attribute data of the source data in the corresponding blockchain. Therefore, the peer node 1044 may further obtain the attribute data from the blockchain network 100 (for example, the blockchain maintained by the peer node 1044), and the client 1042 presents the attribute data of the source data to the second user. The attribute data may specifically include the at least one of the hash value, metadata, the description information, the attestation data, and the pricing data of the source data. For definitions of the hash value, the metadata, the description information, the attestation data, and the pricing data, refer to the related content descriptions in step S302. Details are not described herein again.

Specifically, the client 1042 presents the attribute data of the source data to the second user (a user using the client 1042). The second user may browse, by using the client 1042, the attribute data of the source data provided by the data provider 102, select at least one piece of source data, and trigger an application operation for the source data. Correspondingly, the client 1042 may generate the data application request.

In an optional implementation, the source data provided by the data provider 102 is valuable, and the data consumer 104 may pay a specific quantity of assets to obtain the source data. The asset may be converted into a digital token (token) on a blockchain. For example, currencies, stocks, real estates, gold, patents, and carbon credits all can be converted into tokens for transactions.

Based on this, the blockchain network 100 (for example, each peer node in the blockchain network 100) may further lock a target quantity of tokens in an account of the data consumer 104 by using a smart contract. Therefore, after obtaining the source data, the data consumer 104 transfers the target quantity of tokens to an account of the data provider 102.

In an optional implementation, the data provider 100 may alternatively provide the source data free of charge. Correspondingly, the step of locking the target quantity of tokens by using the smart contract may not be performed when the data processing method is performed.

In an optional implementation, the peer node 1024 in the data provider 102 in the blockchain network 100 may further receive a data application notification triggered by using the smart contract. The data application notification includes an identifier of the data consumer 104, an identifier of the data provider 102, and an identifier of the source data that the data consumer 104 applies for. These identifiers are usually unique. For example, one data consumer 104 may be uniquely determined based on an identifier of the data consumer. For another example, one piece of source data may be uniquely determined based on an identifier of the one piece of source data.

The identifier of the data consumer 104 may be an address, a name, or the like of the data consumer 104. The identifier of the data provider 102 may be an address, a name, or the like of the data provider 102. The identifier of the source data may be a name, a hash value, or the like of the source data. To enable the data provider to process the data application request in time, the following processing logic may be set in the smart contract: When the data application request of the data consumer 104 is uploaded to the blockchain network 100, the data application notification is sent to the data provider 102.

In an optional implementation, the step of receiving the data application notification may not be performed when the data processing method is performed. For example, the data provider 102 may query whether the blockchain network 100 (for example, the blockchain maintained by the blockchain network 100) includes the data application request, to determine whether the data consumer 104 applies for data and determine specific data that the data consumer 104 applies for. During specific implementation, the data provider 102 may periodically perform blockchain query to determine data that the data consumer 104 applies for.

Step S310: The peer node 1024 encrypts a storage address of the ciphertext of the source data by using a public key of the data consumer 104, to obtain the encrypted storage address.

The data consumer 104 (for example, the peer node 1044) locally generates a public-private key pair, and a public key in the public-private key pair is uploaded to the blockchain network 100. Therefore, each peer node in the blockchain network 100 can obtain the public key from the corresponding blockchain, and the private key is locally stored. Correspondingly, the peer node 1024 in the data provider 102 may encrypt the storage address of the ciphertext of the source data by using the public key of the data consumer 104, to obtain the encrypted storage address. The encrypted storage address is specifically decrypted by a party having a private key. When a private key of the data consumer 104 is not leaked, only the data consumer 104 (for example, the peer node 1044) can decrypt the encrypted storage address to obtain the storage address of the ciphertext of the source data. This ensures security of the source data.

Step S312: The peer node 1024 uploads the encrypted storage address to the blockchain maintained by the blockchain network 100.

Considering openness and traceability of the blockchain network 100, the data provider 102 uploads the encrypted storage address to the blockchain network 100. Correspondingly, each peer node in the blockchain network 100 may maintain the encrypted storage address in the corresponding blockchain, so that the data consumer 104 can obtain the encrypted storage address from the blockchain network 100 (for example, the blockchain maintained by each peer node in the blockchain network 100). In addition, the operation that the data consumer 104 obtains the encrypted storage address may be recorded in the blockchain network 100 (for example, the blockchain maintained by each peer node in the blockchain network 100). Therefore, when the data provider 102 and the data consumer 104 dispute, tracing may be further performed based on the record of the operation for the encrypted storage address in the blockchain network 100.

In an optional implementation, the peer node 1044 in the data consumer 104 in the blockchain network 100 may further receive a data application success notification triggered by using the smart contract. The data application success notification is specifically used to notify the data consumer 104 that the ciphertext of the source data has been uploaded to the data storage platform 200, and the data consumer 104 may obtain the ciphertext of the source data from the data storage platform 200. The data application success notification includes at least the identifier of the data consumer 104, for example, the address or the name of the data consumer 104. The data application success notification further includes the identifier of the source data, for example, the name of the source data. Therefore, when applying for a plurality of pieces of source data, the data consumer 104 may learn of specific source data that is successfully applied for.

In an optional implementation, the data application success notification may further include the identifier of the data provider 102, for example, the address or the name of the data provider 102. Therefore, the data consumer 102 may learn of specific data providers 102 that have provided source data and specific data providers that do not provide source data. In some embodiments, the data consumer 102 may resend the data application request to the data provider 102 that does not provide source data.

Similar to the data application notification, to enable the data consumer 104 to obtain the ciphertext of the source data in time, the following processing logic may be set in the smart contract: When uploading the encrypted storage address to the blockchain network 100, the data provider 104 sends the data application success notification to the data consumer 104.

In an optional implementation, the step of receiving the data application success notification may not be performed when the data processing method is performed. For example, the data consumer 104 may periodically perform blockchain query to determine whether data application succeeds.

Step S314: The peer node 1044 in the data consumer 104 obtains the encrypted storage address from the blockchain, and decrypts the encrypted storage address by using the private key of the data consumer 104, to obtain the storage address.

Step S316: The peer node 1044 accesses the data storage platform 200 based on the storage address to obtain the ciphertext of the source data.

Considering that a ciphertext of the storage address is obtained through encryption by using the public key of the data consumer 104, the peer node 1044 in the data consumer 104 may obtain the storage address of the ciphertext of the source data in the data storage platform 200 from the encrypted storage address through decryption by using the private key of the data consumer 104. Then, the data consumer 104 may access the data storage platform 200 based on the storage address to obtain the ciphertext of the source data.

Step S318: The peer node 1044 in the data consumer 104 obtains an encrypted first symmetric key from the blockchain, and obtains the first symmetric key through decryption by using the private key of the data consumer 104.

In an optional implementation, the data provider 102 may further encrypt the first symmetric key used to encrypt the source data, to obtain the encrypted first symmetric key, and upload the encrypted first symmetric key to the blockchain network 100. Correspondingly, the peer node in the blockchain network 100 may maintain the encrypted first symmetric key in the corresponding blockchain. Therefore, the peer node 1044 in the data consumer 104 may obtain the encrypted first symmetric key from the blockchain.

During specific implementation, the peer node 1024 in the data provider 102 may encrypt the first symmetric key by using the public key of the data consumer 104. The data provider 102 uploads the encrypted first symmetric key to the blockchain network 100. Correspondingly, the peer node in the blockchain network 100 maintains the encrypted first symmetric key in the corresponding blockchain. The data consumer 104 obtains the encrypted first symmetric key from the blockchain network 100 (for example, the blockchain maintained by the peer node 1042 in the data consumer 104), and obtains the first symmetric key through decryption by using the private key of the data consumer 104.

In an optional implementation, step S318 may not be performed when the data processing method is performed. For example, the data consumer 104 and the data provider 102 may perform key pre-negotiation; the data provider 102 encrypts the source data by using a key obtained through negotiation, to obtain the ciphertext of the source data; and the data consumer 104 obtains the source data by decrypting the ciphertext of the source data by using the key obtained through negotiation.

Step S320: The peer node 1044 in the data consumer 104 decrypts the ciphertext of the source data by using the first symmetric key, to obtain the source data.

Step S322: The peer node 1044 in the data consumer 104 sends the source data to the client 1042.

In some possible implementations, after obtaining the source data, the client 1042 in the data consumer 104 may further perform verification on the source data. For example, the client 1042 may perform verification on the obtained source data by using the attribute data of the source data. A hash value is used as an example. The client 1042 may perform a hash operation on the source data to obtain a hash value of the source data, and then compare the hash value with the hash value carried in the attribute data obtained from the blockchain. If the two hash values are consistent, it indicates that the source data is not tampered with, and the verification on the source data succeeds. After the verification succeeds, the client 1042 in the data consumer 104 may further send a data verification completion notification to the peer node 1044, the peer node 1044 may send the data verification completion notification to the blockchain network 100, and the peer node in the blockchain network 100 maintains the data verification completion notification in the corresponding blockchain.

Optionally, in a data transaction scenario, the second user may further evaluate a current data transaction by using the client 1042; and the client 1042 receives information about the evaluation of the second user on the current data transaction, and sends the evaluation information to the peer node 1044. The data consumer 104 (for example, the peer node 1044) may further submit the evaluation information of the current data transaction to the blockchain network 100, and the peer node 1044 in the blockchain network 100 may further maintain the evaluation information of the current data transaction in the corresponding blockchain.

In an optional implementation, when data exchange is paid exchange, the blockchain network 100 (for example, each peer node) may further trigger the smart contract to transfer the locked target quantity of tokens to the data provider 102, to complete the data transaction. Specifically, by using the smart contract, each peer node in the blockchain network 100 may increase a target quantity of tokens for an asset of the data provider 102, and decrease a target quantity of tokens for an asset of the data consumer 102.

By performing step S302 to step S328 included in the data processing method, trusted data exchange between the data provider 102 and the data consumer 104 can be implemented by using the data storage platform 200 and the blockchain network 100. A difference from the conventional technology is that the data consumer 104 does not need a help of a third-party platform in a process of obtaining source data. This avoids damage to data jurisdiction and ownership such as a use right and a dominance right, prevents user data and a service from stopping running because of interference or service termination of a platform service provider, and implements relatively high reliability.

An embodiment of this application further provides a data processing method for data analysis. Data analysis may be performed by the data executor 106.

In a possible data analysis application scenario, when having a data analysis requirement, the data consumer 104 may upload the data analysis request to the blockchain network 100. Correspondingly, a peer node in the blockchain network 100 may maintain the data analysis request in a corresponding blockchain, and the data executor 106 may exchange data with the data provider 102 in response to the data analysis request. After obtaining source data by exchanging the data with the data provider 102, the data executor 106 analyzes the source data to obtain a data analysis result, encrypts the data analysis result, and then uploads the encrypted data analysis result to the data storage platform 200. The data consumer 104 accesses the data storage platform 200 to obtain a ciphertext of the data analysis result, and then decrypts the ciphertext of the data analysis result to obtain the data analysis result.

Figure 4A:
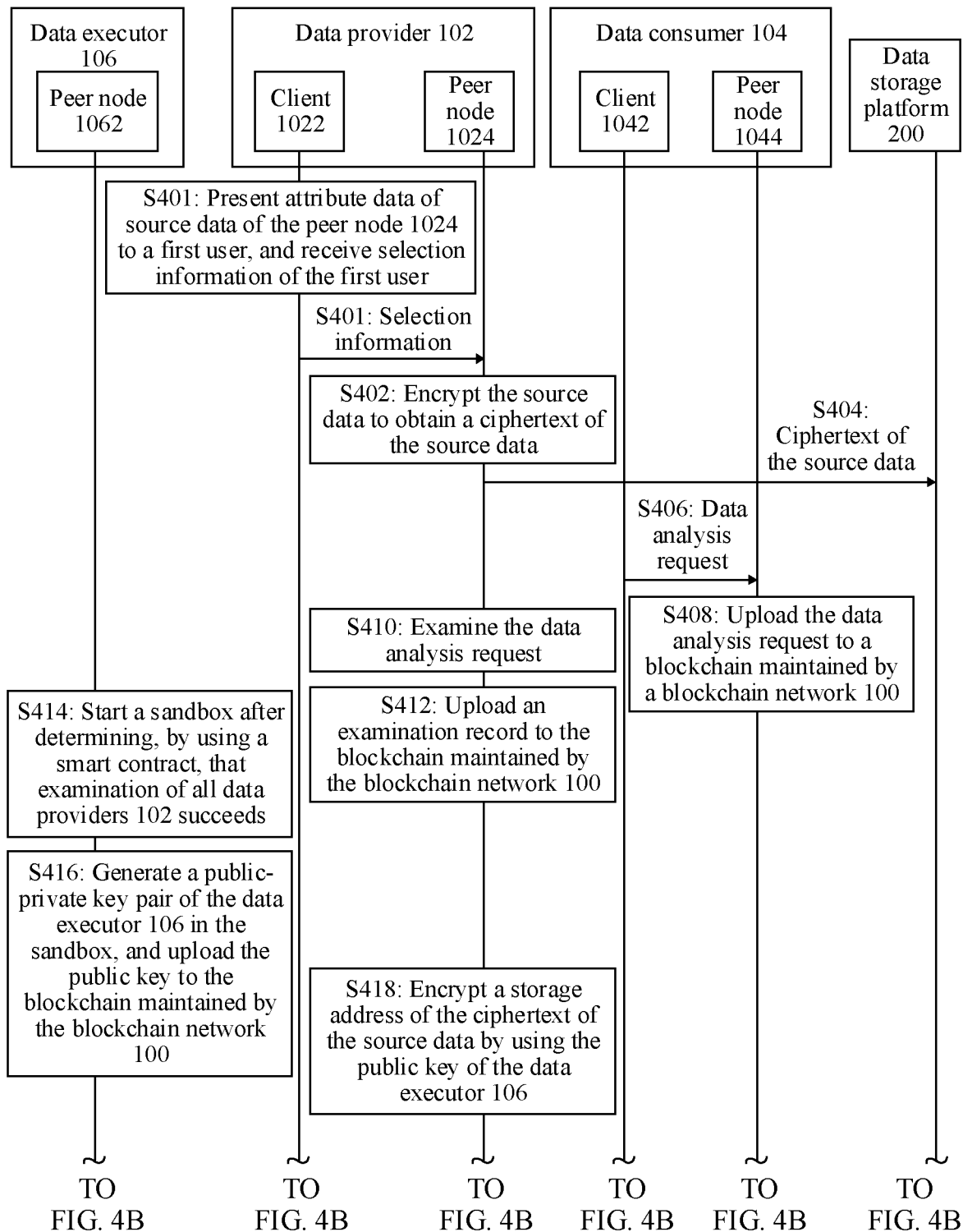
FIG. 4A and FIG. 4B are a flowchart of interaction of a data processing method according to an embodiment of this application.
Figure 4B:
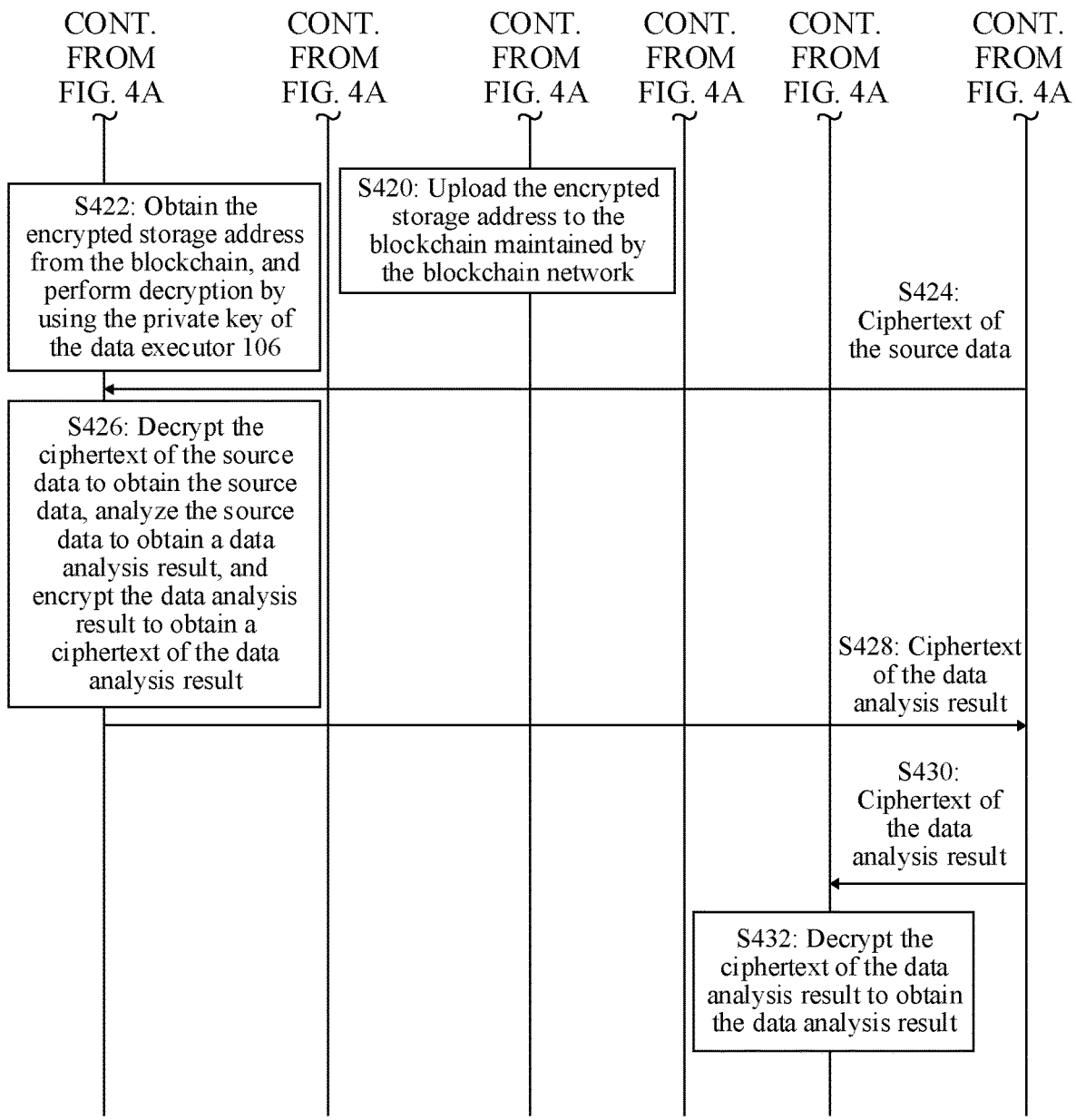

FIG. 4A and FIG. 4B are a flowchart of a data processing method. The method includes step S401 to step S432.

Step S401: The client 1022 presents attribute data of source data of the peer node 1024 to a first user, receives selection information of the first user, and sends the selection information to the peer node 1024.

Step S402: The peer node 1024 encrypts the source data based on the selection information to obtain a ciphertext of the source data.

Step S404: The peer node 1024 uploads the ciphertext of the source data to the data storage platform 200.

For specific implementation of step S401 to step S404, refer to step S301 to step S304. Details are not described in this embodiment of this application again.

Step S406: The client 1042 in the data consumer 104 sends a data analysis request to the peer node 1044.

Step S408: The peer node 1044 uploads the data analysis request to the blockchain maintained by the blockchain network 100.

When a second user needs to obtain a data analysis result, for example, obtains the data analysis result without touching the source data, the second user may trigger a data analysis operation by using the client 1042. The client 1042 may generate the data analysis request based on the data analysis operation triggered by the second user. The data analysis request is specifically used to analyze a plurality of pieces of source data to obtain a data analysis result. The plurality of pieces of source data may be data provided by a same data provider 102, or may be data provided by different data providers 102.

In an optional implementation, the data analysis request may further carry a storage address of the data analysis result. In consideration of security of the data analysis result, the storage address of the data analysis result may be specifically a storage address of a ciphertext of the data analysis result. The storage address of the ciphertext of the data analysis result may be an address specified by the data consumer 104. For example, the data consumer 104 may obtain a part of vacant address space in the data storage platform 200, and determine the storage address of the data analysis result (or the storage address of the ciphertext of the data analysis result) based on the address space.

A process in which the peer node 1044 uploads the data analysis request to the blockchain maintained by the blockchain network 100 is similar to the process in which the peer node 1044 uploads the data application request to the blockchain maintained by the blockchain network 100 in the embodiment shown in FIG. 3. Details are not described herein again.

In an optional implementation, the peer node 1024 in the data provider 102 in the blockchain network 100 may further receive a data analysis notification triggered by using a smart contract. The data analysis notification is specifically used to indicate the data provider 102 to provide the source data for data analysis. The data analysis notification specifically includes an identifier of the data consumer 104, an identifier of at least one data provider 102, and an identifier of the source data that the data consumer 104 requests to analyze.

The identifier of the data consumer 104 may be an address, a name, or the like of the data consumer 104. The identifier of the data provider 102 may be an address, a name, or the like of the data provider 102. The identifier of the source data may be a name, a hash value, or the like of the source data.

To enable the data provider to process the data analysis request in time, the following processing logic may be set in the smart contract: When the data analysis request of the data consumer 104 is uploaded to the blockchain network 100, the data analysis notification is sent to the data provider 102.

In an optional implementation, the step of receiving the data analysis notification may not be performed when the data processing method is performed. For example, the data provider 102 may poll the blockchain network 100 (for example, the blockchain maintained by the peer node 1022 in the data provider 102), to determine whether the data consumer 104 uploads the data analysis request.

Step S410: The peer node 1024 examines the data analysis request.

Specifically, the peer node 1024 in the data provider 102 may perform identity authentication on the data consumer 104, for example, determine whether the data consumer 104 is an authorized user that allows data analysis, so as to examine the data analysis request. When the identity authentication succeeds, the request is approved; otherwise, the request is not approved.

Step S412: The peer node 1024 uploads an examination record to the blockchain maintained by the blockchain network 100.

Considering traceability, the data provider 102 may further upload the examination record to the blockchain network 100. Correspondingly, the peer node in the blockchain network 100 may maintain the examination record in the corresponding blockchain. The examination record includes at least an examination result, and the examination result indicates whether the data analysis request is approved. In an optional implementation, the examination result may further include information such as an examination time and an examiner.

In an optional implementation, step S410 to step S412 may not be performed when the data processing method is performed.

Step S414: The data executor 106 (for example, a peer node 1062 in the data executor 106) starts a sandbox when determining, by using the smart contract, that examination of all data providers 102 succeeds.

In an optional implementation, when determining, based on the smart contract, that the examination of all the data providers 102 succeeds, the data executor 106 may pull an image from an image repository address, and start the sandbox (sandbox) in an environment of the data executor 106.

The sandbox is an execution environment that restricts program behavior according to a security policy. The sandbox may restrict service logic to only performing data analysis and outputting a result to a specific location (for example, a storage address of an analysis result that is specified by the data consumer 104). However, the source data provided by the data provider 102 is not output to the outside of the sandbox. The sandbox is placed in a repository that is public to all participants. The service logic of the sandbox is public to all the participants, and can be reviewed and audited by all the participants. This can ensure sandbox reliability.

When there is a higher data security requirement, the sandbox may be further run in a trusted execution environment (TEE), to enhance data security.

Optionally, the sandbox may be replaced with another instance that provides a trusted execution environment. For example, the instance may be a container or a secure virtual machine.

Step S416: The data executor 106 generates a public-private key pair of the data executor 106 in the sandbox, and uploads the public key to the blockchain maintained by the blockchain network 100.

The private key of the data executor 106 is stored locally, for example, stored in a local sandbox, so as to ensure security of the private key. The public key of the data executor 106 is stored in the blockchain maintained by the blockchain network 100, so that the data consumer 104 or the data executor 106 obtains the public key of the data executor 106 from the blockchain, and performs encryption processing by using the public key of the data executor 106.

Generating the public-private key pair in the sandbox is merely an implementation for ensuring security of information such as the private key. In another possible implementation, the security of the information such as the private key may also be ensured in another manner.

Step S418: The peer node 1024 encrypts a storage address of the ciphertext of the source data by using the public key of the data executor 106, to obtain the encrypted storage address.

Step S420: The peer node 1024 uploads the encrypted storage address to the blockchain maintained by the blockchain network 100.

Step S422: The data executor 106 obtains the encrypted storage address from the blockchain, and performs decryption by using the private key of the data executor 106.

In an optional implementation, after uploading the encrypted storage address to the blockchain maintained by the blockchain network 100, the data provider 102 may send a notification message to the data executor 106 (for example, the peer node 1062) by using the smart contract, to indicate the data executor 106 to obtain the encrypted storage address from the blockchain. In another optional implementation, the data executor 106 may alternatively periodically perform blockchain query to obtain the encrypted storage address.

The encrypted storage address is obtained through encryption by using the public key of the data executor 106, and the data executor 106 may decrypt the encrypted storage address by using the private key of the data executor, to obtain the storage address. Considering data security, the data executor 106 may decrypt the ciphertext of the storage address in the sandbox by using the private key of the data executor, to obtain the storage address.

Optionally, after obtaining the storage address of the ciphertext of the source data, the data executor 106 (for example, the peer node 1062) may further delete the private key of the data executor 106. This prevents the storage address of the ciphertext of the source data from being leaked due to theft of the private key, and ensures security of the source data. The data executor 106 may delete the foregoing private key in a physical destruction manner, so that the private key cannot be recovered. This ensures security of the source data.

Step S424: The data executor 106 (for example, the peer node 1062) accesses the data storage platform 200 based on the storage address to obtain the ciphertext of the source data.

Step S426: The data executor 106 (for example, the peer node 1062) decrypts the ciphertext of the source data to obtain the source data, analyzes the source data to obtain the data analysis result, and encrypts the analysis result of the source data to obtain the ciphertext of the data analysis result.

In an optional implementation, the data provider 102 may encrypt, by using the public key of the data executor 106, a key used to encrypt the source data, for example, a first symmetric key, and then upload the encrypted key to the blockchain network 100. Correspondingly, the peer node in the blockchain network 100 maintains the encrypted public key in the corresponding blockchain. Therefore, the data executor 106 may obtain the encrypted first symmetric key from the blockchain, obtain the first symmetric key through decryption by using the private key of the data executor, and then decrypt the ciphertext of the source data by using the first symmetric key, to obtain the source data.

In an optional implementation, the data provider 102 may encrypt the source data by using a key pre-agreed on with the data executor 106, to obtain the ciphertext of the source data. Correspondingly, the data executor 106 may decrypt the ciphertext of the source data by using a key agreed on with the data provider 102, to obtain the source data.

The data executor 106 performs calculation on a plurality of pieces of source data (source data provided by a same data provider 102 or different data providers 102), to analyze the source data. Based on calculation results of the plurality of pieces of source data, data analysis results of the plurality of pieces of source data may be obtained.

To ensure security, the data executor 106 may encrypt the data analysis result to obtain the ciphertext of the data analysis result. Specifically, the data executor 106 may encrypt the data analysis result by using a second symmetric key and a symmetric encryption algorithm, to obtain the ciphertext of the data analysis result.

In an optional implementation, the first symmetric key and the second symmetric key may be a same key. To prevent both the source data and the data analysis result from being leaked due to theft of one key, the first symmetric key and the second symmetric key may alternatively be different keys. This can prevent privacy risks from being increased.

Step S428: The data executor 106 uploads the ciphertext of the data analysis result to the data storage platform 200.

If the data analysis request carries the storage address of the data analysis result, for example, the storage address of the ciphertext of the data analysis result, the data executor 106 may upload the ciphertext of the data analysis result to the data storage platform 200 based on the storage address of the ciphertext of the data analysis result.

If the data analysis request does not carry the storage address of the ciphertext of the analysis result, the data executor 106 may alternatively store the ciphertext of the data analysis result in the data storage platform 200 in a sequential or random storage manner, encrypt the storage address of the ciphertext of the data analysis result, and then upload the encrypted storage address of the ciphertext of the data analysis result to the blockchain maintained by the blockchain network 100.

After uploading the ciphertext of the data analysis result to the data storage platform 200, the data executor 106 may further destruct the source data and the data analysis result. This prevents the source data and the data analysis result from being leaked, and improves security.

Step S416, step S422, step S424, step S426, and step S428 may be performed in the sandbox. This ensures security of the source data and the data analysis result, and avoids data leakage.

Step S430: The peer node 1044 in the data consumer 104 obtains the ciphertext of the data analysis result from the data storage platform 200.

In an optional implementation, the peer node 1044 in the data consumer 104 may obtain the ciphertext of the data analysis result from the data storage platform 200 based on an address specified by the peer node 1044. In another optional implementation, the data consumer 104 may alternatively obtain the encrypted storage address from the blockchain, decrypt the encrypted storage address to obtain the storage address of the ciphertext of the data analysis result, and obtain the ciphertext of the data analysis result based on the storage address.

Step S432: The peer node 1044 in the data consumer 104 decrypts the ciphertext of the data analysis result to obtain the data analysis result.

In an optional implementation, the peer node 1062 in the data executor 106 may further encrypt, by using a public key of the data consumer 102, a key (for example, the second symmetric key) used to encrypt the data analysis result, and then upload the encrypted key to the blockchain maintained by the blockchain network 100. The peer node 1044 in the data consumer 104 obtains the encrypted second symmetric key from the blockchain, and obtains the second symmetric key through decryption by using a private key of the data consumer. Then, the peer node 1044 decrypts the ciphertext of the data analysis result by using the second symmetric key, to obtain the data analysis result.

In an optional implementation, the data executor 106 may alternatively encrypt the data analysis result by using a key obtained through pre-negotiation with the data consumer 104, to obtain the ciphertext of the data analysis result. Correspondingly, the data consumer 104 may decrypt the ciphertext of the data analysis result by using a key obtained through pre-negotiation with the data executor 106, to obtain the data analysis result.

The data processing method provided in this embodiment can implement trusted data calculation by using the data storage platform 200 and the blockchain network 100. The public-private key pair of the data executor 106 is generated in the sandbox, and the private key in the public-private key pair is controlled by a machine and is destructed after running of the sandbox ends. This ensures security of the source data. Further, after the ciphertext of the data analysis result is uploaded to the blockchain maintained by the blockchain network 100, the source data and the data analysis result in the sandbox are destructed. This further ensures security of the source data and the data analysis result.

The data processing method is separately described by using an example in which the data processing request is the data application request in FIG. 3 and an example in which the data processing request is the data analysis request in FIG. 4A and FIG. 4B. In some possible implementations, the data consumer 104 may alternatively send another type of data processing request. In response to the data processing request, the data provider 102 may encrypt the storage address of the ciphertext of the source data by using the public key of the data consumer 104 or the public key of the data executor 106, and then upload the encrypted storage address to the blockchain network 100, so that the data consumer 104 or the data executor 106 decrypts the ciphertext of the storage address by using the private key of the data consumer or the data executor, to obtain the storage address of the ciphertext of the source data. The data consumer 104 or the data executor 106 accesses the data storage platform 200 based on the storage address to obtain the ciphertext of the source data. The data consumer 104 or the data executor 106 decrypts the ciphertext of the source data to obtain the source data, and obtains a data processing result by processing the source data. If the data executor 106 needs to process the source data, the data executor 106 may encrypt the data processing result, and then upload the encrypted data processing result to the data storage platform 200. The data consumer 104 may access the data storage platform 200 based on a storage address of the data processing result to obtain a ciphertext of the data processing result, and then decrypt the ciphertext of the data processing result to obtain the data processing result.

The foregoing describes in detail the data processing methods provided in embodiments of this application with reference to FIG. 1 to FIG. 4A and FIG. 4B. The following describes data processing apparatuses and devices provided in embodiments of this application with reference to the accompanying drawings.

Figure 5:
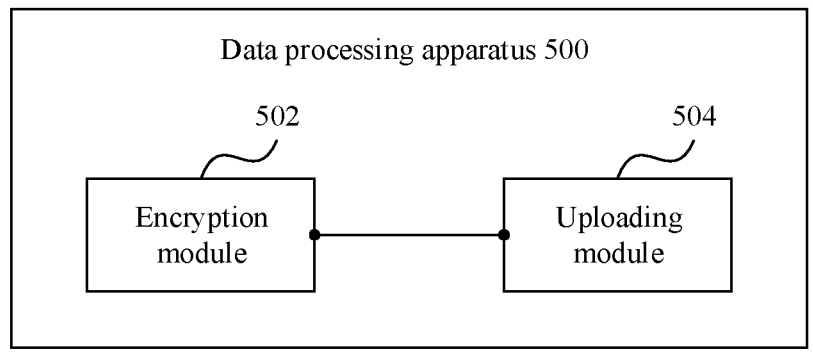
FIG. 5 is a schematic diagram of a structure of a data processing apparatus according to an embodiment of this application.

FIG. 5 is a schematic diagram of a structure of a data processing apparatus. The apparatus 500 is applied to a data provider. The apparatus 500 includes: an encryption module 502, configured to encrypt source data of the data provider to obtain a ciphertext of the source data; and an uploading module 504, configured to upload the ciphertext of the source data to a data storage platform for storage.

The encryption module 502 is further configured to: in response to a data application request of a data consumer, encrypt a storage address of the ciphertext of the source data by using a public key of the data consumer.

The uploading module 504 is further configured to upload the encrypted storage address to a blockchain network. The data provider and the data consumer are both located in the blockchain network, and the storage address is transferred to the data consumer in the blockchain network.

In some possible implementations, the encryption module 502 is further configured to encrypt a symmetric key by using the public key of the data consumer. The symmetric key is used to encrypt the source data.

The uploading module 504 is further configured to upload the encrypted symmetric key to the blockchain network.

In some possible implementations, the uploading module 504 is further configured to:
upload an examination record of the data application request to the blockchain network.

In some possible implementations, the uploading module 504 is further configured to:
upload attribute data of the source data to the blockchain network, where the attribute data includes at least one of a hash value, metadata, description information, attestation data, and pricing data of the source data.

Figure 6:
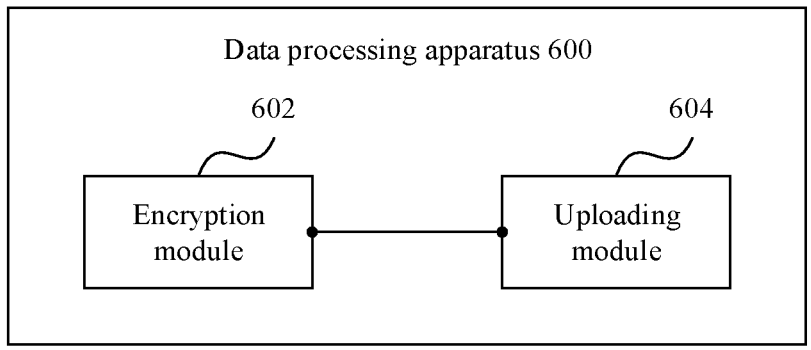
FIG. 6 is a schematic diagram of a structure of a data processing apparatus according to an embodiment of this application.

An embodiment of this application further provides a data processing apparatus. FIG. 6 is a schematic diagram of a structure of the data processing apparatus. The apparatus 600 is applied to a data provider. The apparatus 600 includes:
an encryption module 602, configured to encrypt source data of the data provider to obtain a ciphertext of the source data; and
an uploading module 604, configured to upload the ciphertext of the source data to a data storage platform for storage.

The encryption module 602 is further configured to: in response to a data analysis request of a data consumer, encrypt a storage address of the ciphertext of the source data by using a public key of a data executor.

The uploading module 604 is further configured to upload the encrypted storage address to the blockchain network. The data provider, the data consumer, and the data executor are all located in a blockchain network, and the storage address is transferred to the data executor in the blockchain network.

In some possible implementations, the encryption module 602 is further configured to encrypt a first symmetric key by using the public key of the data executor. The first symmetric key is used to encrypt the source data.

The uploading module 604 is further configured to upload the encrypted first symmetric key to the blockchain network.

In some possible implementations, the uploading module 602 is further configured to:
upload an examination record of the data analysis request to the blockchain network.

In some possible implementations, the uploading module 602 is further configured to:
upload attribute data of the source data to the blockchain network, where the attribute data includes at least one of a hash value, metadata, description information, attestation data, and pricing data of the source data.

Figure 7:
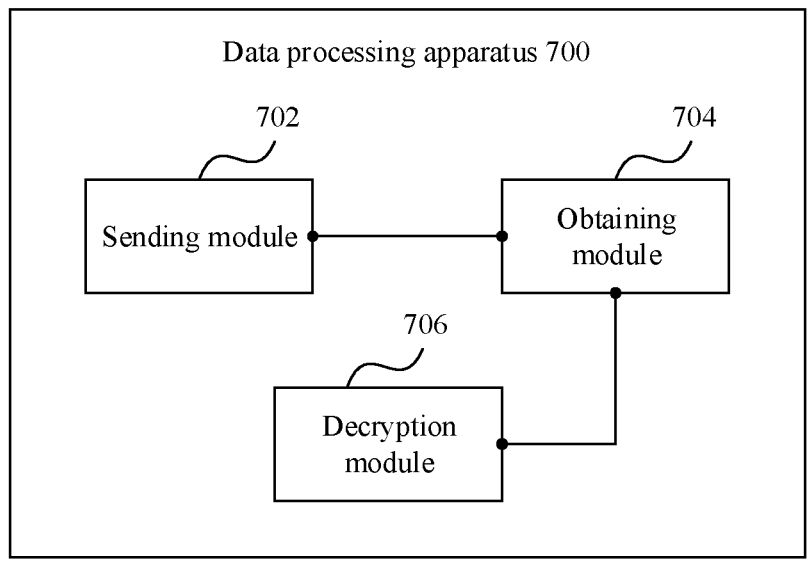
FIG. 7 is a schematic diagram of a structure of a data processing apparatus according to an embodiment of this application.

An embodiment of this application further provides a data processing apparatus. FIG. 7 is a schematic diagram of a structure of the data processing apparatus. The apparatus 700 is applied to a data consumer. The apparatus 700 includes:
a sending module 702, configured to send a data application request, where the data application request is used to request source data of a data provider, the data provider and the data consumer are both located in a blockchain network, and the source data is stored in a data storage platform;
an obtaining module 704, configured to: obtain a storage address of the source data from the blockchain network, and obtain a ciphertext of the source data from the data storage platform based on the storage address; and
a decryption module 706, configured to decrypt the ciphertext of the source data to obtain the source data.

In some possible implementations, the obtaining module 704 is further configured to:
obtain attribute data of the source data of the data provider from the blockchain network, where the attribute data includes at least one of a hash value, metadata, description information, attestation data, and pricing data of the source data.

In some possible implementations, the apparatus 700 further includes:
a presentation module, configured to present the attribute data of the source data to a user.

In some possible implementations, the decryption module 706 is further configured to:
when the storage address obtained from the blockchain network is encrypted by using a public key of the data consumer, obtain the storage address by decrypting the encrypted storage address by using a private key of the data consumer.

In some possible implementations, the obtaining module 704 is further configured to obtain an examination record of the data application request, and the apparatus 700 further includes:
a processing module, configured to maintain the examination record in a blockchain.

In some possible implementations, the apparatus 700 further includes:
a verification module, configured to: process the source data by using a hash algorithm, to obtain a hash value of the source data; and perform verification on correctness of the source data based on the hash values of the source data.

Figure 8:
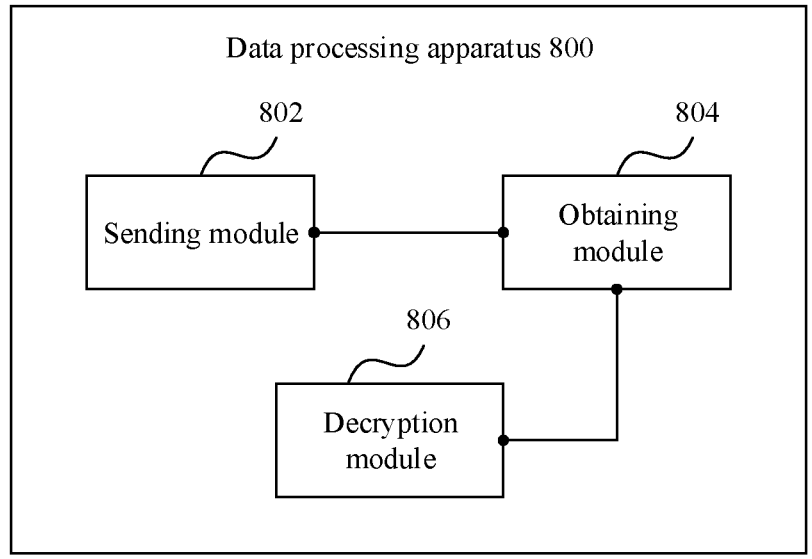
FIG. 8 is a schematic diagram of a structure of a data processing apparatus according to an embodiment of this application.

An embodiment of this application further provides a data processing apparatus. FIG. 8 is a schematic diagram of a structure of the data processing apparatus. The apparatus 800 is applied to a data consumer. The apparatus 800 includes:
a sending module 802, configured to send a data analysis request, where the data analysis request is used to analyze source data of a data provider, the data provider and the data consumer are both located in a blockchain network, and the source data is stored in a data storage platform;
an obtaining module 804, configured to obtain a ciphertext of a data analysis result from the data storage platform based on a storage address of the ciphertext of the data analysis result in the data storage platform; and
a decryption module 806, configured to decrypt the ciphertext of the data analysis result to obtain the data analysis result.

In some possible implementations, the obtaining module is further configured to:
    obtain attribute data of the source data of the data provider from the blockchain network, where the attribute data includes at least one of a hash value, metadata, description information, attestation data, and pricing data of the source data.

In some possible implementations, the apparatus 800 further includes:
    a presentation module, configured to present the attribute data of the source data to a user, where the attribute data includes the at least one of the hash value, the metadata, the description information, the attestation data, and the pricing data of the source data.

In some possible implementations, the obtaining module is further configured to obtain, from the blockchain network, a second symmetric key encrypted by using a public key of the data consumer. The second symmetric key is used to encrypt the data analysis result.

The decryption module is further configured to obtain the second symmetric key by decrypting the encrypted second symmetric key by using a private key of the data consumer.

The decryption module is further configured to decrypt the ciphertext of the data analysis result by using the second symmetric key, to obtain the data analysis result.

In some possible implementations, the obtaining module 804 is further configured to obtain an examination record of the data analysis request, and the apparatus 800 further includes:
    a processing module, configured to maintain the examination record in a blockchain.

Figure 9:
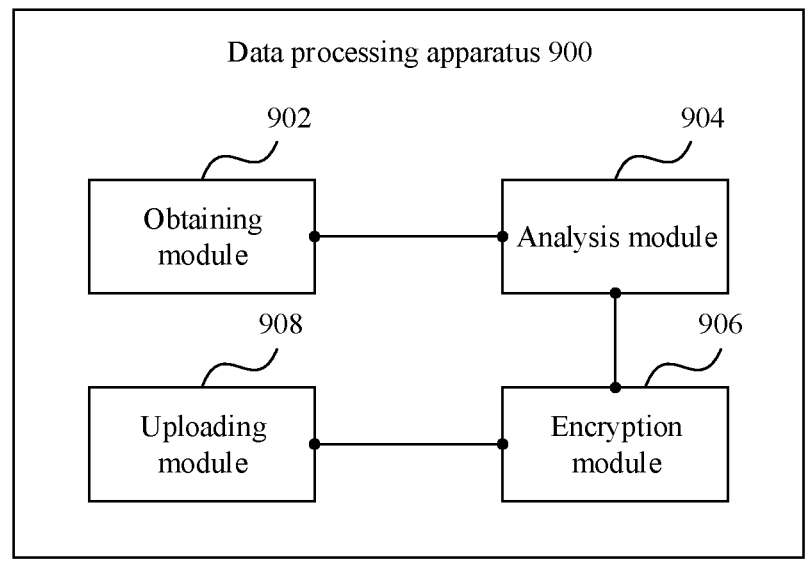
FIG. 9 is a schematic diagram of a structure of a data processing apparatus according to an embodiment of this application.

An embodiment of this application further provides a data processing apparatus. FIG. 9 is a schematic diagram of a structure of the data processing apparatus. The apparatus 900 is applied to a data executor. The apparatus 900 includes:
    an obtaining module 902, configured to: obtain a storage address of a ciphertext of source data of a data provider from a blockchain network, and obtain the ciphertext of the source data from a data storage platform based on the storage address, where the data executor and the data provider are both located in the blockchain network, and the storage address is transferred to the data executor in the blockchain network;
    an analysis module 904, configured to analyze the source data obtained by decrypting the ciphertext of the source data, to obtain a data analysis result;
    an encryption module 906, configured to encrypt the data analysis result to obtain a ciphertext of the data analysis result; and
    an uploading module 908, configured to upload the ciphertext of the data analysis result to the data storage platform.

In some possible implementations, the encryption module 906 is further configured to encrypt a second symmetric key by using a public key of a data consumer. The second symmetric key is used to encrypt the data analysis result.

The uploading module 908 is further configured to upload the encrypted second symmetric key to the blockchain network.

In some possible implementations, the analysis module 904 is specifically configured to:
    analyze, in a sandbox, the source data obtained by decrypting the ciphertext of the source data, to obtain the data analysis result.

In some possible implementations, the apparatus 900 further includes:
    a verification module, configured to perform, in the sandbox, verification on the source data obtained by decrypting the ciphertext of the source data.

In some possible implementations, the apparatus 900 further includes:
    a deletion module, configured to delete a private key of the data executor after the storage address of the ciphertext of the source data is obtained.

In some possible implementations, the apparatus 900 further includes:
    a deletion module, configured to delete the source data and the data analysis result after the ciphertext of the data analysis result is uploaded to the data storage platform.

The data processing apparatus 500, the data processing apparatus 600, the data processing apparatus 700, the data processing apparatus 800, and the data processing apparatus 900 according to embodiments of this application may correspondingly perform the methods described in embodiments of this application. In addition, the foregoing operations and other operations and/or functions of the modules/units in the data processing apparatus 500, the data processing apparatus 600, the data processing apparatus 700, the data processing apparatus 800, and the data processing apparatus 900 are respectively used to implement corresponding procedures of the methods in embodiments shown in FIG. 2, FIG. 3, and FIG. 4A and FIG. 4B. For brevity, details are not described herein again.

An embodiment of this application further provides a computing device 1000. The computing device 1000 may be an end-side device such as a notebook computer or a desktop computer, or may be a computer cluster in a cloud environment or an edge environment. The computing device 1000 is specifically configured to implement functions of the data processing apparatus 500, the data processing apparatus 600, the data processing apparatus 700, the data processing apparatus 800, or the data processing apparatus 900 in the embodiment shown in FIG. 5, FIG. 6, FIG. 7, FIG. 8, or FIG. 9.

Figure 10:
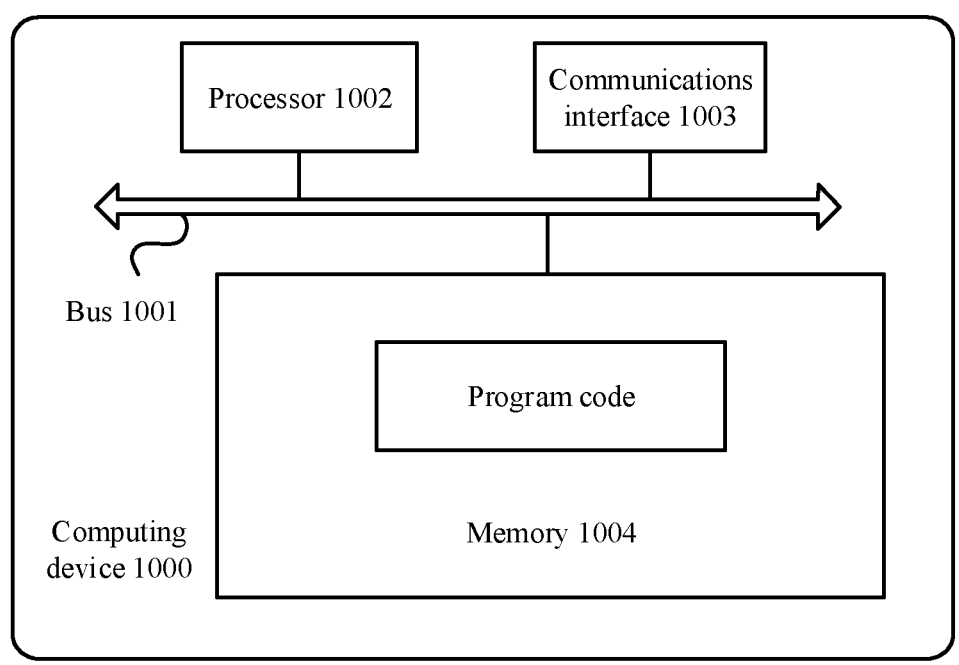
FIG. 10 is a schematic diagram of a structure of a device according to an embodiment of this application.

FIG. 10 is a schematic diagram of a structure of the computing device 1000. As shown in FIG. 10, the device 1000 includes a bus 1001, a processor 1002, a communications interface 1003, and a memory 1004. The processor 1002, the memory 1004, and the communications interface 1003 communicate with each other through the bus 1001.

The bus 1001 may be a peripheral component interconnect (PCI) bus, an extended industry standard architecture (EISA) bus, or the like. Buses may be classified into an address bus, a data bus, a control bus, and the like. For ease of representation, only one thick line is used to represent the bus in FIG. 10, but this does not mean that there is only one bus or only one type of bus.

The processor 1002 may be any one or more of processors such as a central processing unit (CPU), a graphics processing unit (GPU), a microprocessor (MP), or a digital signal processor (DSP).

The communications interface 1003 is configured to communicate with the outside, for example, obtain a storage address from a blockchain network, and obtain a ciphertext of source data from a data storage platform based on the storage address or obtain a ciphertext of a data analysis result from the data storage platform based on a storage address of the ciphertext of the data analysis result in the data storage platform.

The memory 1004 may include a volatile memory (volatile memory), for example, a random access memory (RAM). The memory 1004 may alternatively include a nonvolatile memory (nonvolatile memory), for example, a read-only memory (ROM), a flash memory, a hard disk drive (HDD), or a solid-state drive (SSD).

The memory 1004 stores executable code, and the processor 1002 executes the executable code to perform the foregoing data processing methods. Specifically, when embodiments shown in FIG. 5, FIG. 6, FIG. 7, FIG. 8, and FIG. 9 are implemented, and the modules in the data processing apparatus 500, the data processing apparatus 600, the data processing apparatus 700, the data processing apparatus 800, and the data processing apparatus 900 described in embodiments in FIG. 5, FIG. 6, FIG. 7, FIG. 8, and FIG. 9 are implemented by using software, software or program code required to perform functions of the modules in FIG. 5, FIG. 6, FIG. 7, FIG. 8, and FIG. 9 is stored in the memory 1004. The processor 1002 executes the program code stored in the memory 1004, to perform the data processing methods shown in embodiments in FIG. 2, FIG. 3, and FIG. 4A and FIG. 4B.

An embodiment of this application further provides a computer-readable storage medium. The computer-readable storage medium includes instructions, and the instructions indicate a computing device to perform the data processing methods applied to the data processing apparatus 500, the data processing apparatus 600, the data processing apparatus 700, the data processing apparatus 800, and the data processing apparatus 900.

An embodiment of this application further provides a computer program product. When the computer program product is executed by a computing device, the computing device performs any one of the foregoing data processing methods. The computer program product may be a software installation package. If any one of the foregoing data processing methods needs to be used, the computer program product may be downloaded, and the computer program product may be executed on a computing device.

What is claimed is:

1. A data processing method performed by a data provider, comprising:
   encrypting source data to obtain a ciphertext of the source data;
   uploading the ciphertext of the source data to a data storage platform for storage;
   in response to a data application request or a data analysis request from a data consumer, examining the data application request or data analysis request, wherein the examining comprises performing identity authentication on the data consumer;
   uploading an examination record of the data application request or an examination record of the data analysis request to a blockchain network;
   encrypting a storage address of the ciphertext of the source data by using a public key of the data consumer; and
   uploading the encrypted storage address to the blockchain network, wherein the data provider and the data consumer are both located in the blockchain network, and the storage address is transferred to the data consumer in the blockchain network.

2. The method according to claim 1, further comprising:
   encrypting a symmetric key by using the public key of the data consumer; and
   uploading the encrypted symmetric key to the blockchain network, wherein the symmetric key is for encrypting the source data.

3. The method according to claim 1, further comprising:
   uploading attribute data of the source data to the blockchain network, wherein the attribute data comprises a hash value, metadata, description information, attestation data, or pricing data of the source data.

4. A data processing method performed by a data consumer, comprising:
   sending a data application request to a data provider, wherein the data application request requests source data of the data provider, the data provider and the data consumer are both located in a blockchain network, and the source data is stored in a data storage platform;
   obtaining a storage address of the source data from the blockchain network;
   obtaining a ciphertext of the source data from the data storage platform based on the storage address;
   decrypting the ciphertext of the source data to obtain the source data;
   obtaining an examination record of the data application request; and
   maintaining the examination record in a blockchain.

5. The method according to claim 4, further comprising:
   obtaining attribute data of the source data of the data provider from the blockchain network, wherein the attribute data comprises a hash value, metadata, description information, attestation data, or pricing data of the source data.

6. The method according to claim 5, further comprising:
   presenting the attribute data of the source data to a user.

7. The method according to claim 4, further comprising:
   processing the source data by using a hash algorithm, to obtain a hash value of the source data; and
   performing verification on correctness of the source data based on the hash values of the source data.

8. The method according to claim 4, further comprising:
   sending a data analysis request to the data provider, wherein the data analysis request requests analysis of the source data of the data provider;
   obtaining a ciphertext of a data analysis result from the data storage platform based on a storage address of the ciphertext of the data analysis result in the data storage platform; and
   decrypting the ciphertext of the data analysis result to obtain the data analysis result.

9. The method according to claim 8, further comprising:
   obtaining attribute data of the source data of the data provider from the blockchain network, wherein the attribute data comprises a hash value, metadata, description information, attestation data, or pricing data of the source data.

10. The method according to claim 9, further comprising:
    presenting the attribute data of the source data to a user.

11. The method according to claim 8, further comprising:
    obtaining an examination record of the data analysis request; and
    maintaining the examination record in a blockchain.

12. A computing device, comprising:
    a memory storing executable instructions; and
    a processor configured to execute the executable instructions stored in the memory to function as a data provider to:
    encrypt source data to obtain a ciphertext of the source data, and uploading the ciphertext of the source data to a data storage platform for storage;
    in response to a data application request or a data analysis request of a data consumer, examine the data application request or data analysis request, wherein the examining comprises performing identity authentication on the data consumer;

upload an examination record of the data application request or an examination record of the data analysis request to a blockchain network;

encrypt a storage address of the ciphertext of the source data by using a public key of the data consumer;

uploading the encrypted storage address to a blockchain network, wherein the data provider and the data consumer are both located in the blockchain network, and the storage address is transferred to the data consumer in the blockchain network.

13. The computing device according to claim 12, wherein the processor is further configured to:

encrypt a symmetric key by using the public key of the data consumer; and upload the encrypted symmetric key to the blockchain network, wherein the symmetric key is for encrypting the source data.

14. A computing device, comprising:

a memory storing executable instructions; and a processor configured to execute the executable instructions stored in the memory to function as a data consumer to:

send a data application request to a data provider, wherein the data application request requests source data of the data provider, the data provider and the data consumer are both located in a blockchain network, and the source data is stored in a data storage platform;

obtain a storage address of the source data from the blockchain network;

obtaining a ciphertext of the source data from the data storage platform based on the storage address;

decrypt the ciphertext of the source data to obtain the source data;

obtain an examination record of the data application request; and maintain the examination record in a blockchain.

15. The computing device according to claim 14, wherein the processor is further configured to:

send a data analysis request to the data provider, wherein the data analysis request requests analysis of the source data of the data provider;

obtain a ciphertext of a data analysis result from the data storage platform based on a storage address of the ciphertext of the data analysis result in the data storage platform; and decrypt the ciphertext of the data analysis result to obtain the data analysis result.

16. The computing device according to claim 14, wherein the processor is further configured to: obtain attribute data of the source data of the data provider from the blockchain network, wherein the attribute data comprises a hash value, metadata, description information, attestation data, or pricing data of the source data.

* * * * *